(12) United States Patent
Ikenishi et al.

(10) Patent No.: US 12,187,640 B2
(45) Date of Patent: Jan. 7, 2025

(54) GLASS INCLUDING A SMALL-TRANSMITTANCE PORTION AND A LARGE-TRANSMITTANCE PORTION

(71) Applicant: HOYA CORPORATION, Tokyo (JP)

(72) Inventors: Mikio Ikenishi, Tokyo (JP); Yoshitake Tanno, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 158 days.

(21) Appl. No.: 17/608,873

(22) PCT Filed: Apr. 30, 2020

(86) PCT No.: PCT/JP2020/018279
§ 371 (c)(1),
(2) Date: Jan. 17, 2023

(87) PCT Pub. No.: WO2020/230649
PCT Pub. Date: Nov. 19, 2020

(65) Prior Publication Data
US 2023/0250016 A1    Aug. 10, 2023

(30) Foreign Application Priority Data
May 10, 2019   (JP) .................. 2019-089773

(51) Int. Cl.
| | |
|---|---|
| C03C 23/00 | (2006.01) |
| C03C 3/21 | (2006.01) |
| C03C 4/02 | (2006.01) |
| C03C 17/09 | (2006.01) |
| G02B 1/12 | (2006.01) |
| G02B 5/00 | (2006.01) |

(52) U.S. Cl.
CPC .............. *C03C 23/007* (2013.01); *C03C 3/21* (2013.01); *C03C 4/02* (2013.01); *C03C 17/09* (2013.01); *G02B 1/12* (2013.01); *C03C 2217/254* (2013.01); *C03C 2217/27* (2013.01); *C03C 2218/154* (2013.01); *C03C 2218/328* (2013.01)

(58) Field of Classification Search
None
See application file for complete search history.

(56) References Cited

U.S. PATENT DOCUMENTS

| | | | | |
|---|---|---|---|---|
| 5,127,930 A | * | 7/1992 | Howorth | H01J 9/24 65/32.4 |
| 11,656,456 B2 | * | 5/2023 | Nakamura | G02B 5/003 359/601 |
| 2002/0073735 A1 | * | 6/2002 | Hayashi | C03C 3/16 65/32.1 |

(Continued)

FOREIGN PATENT DOCUMENTS

| | | | | |
|---|---|---|---|---|
| JP | 2002-201041 | | 7/2002 | |
| WO | WO-2012043815 A1 | * | 4/2012 | ............. C03C 3/064 |

OTHER PUBLICATIONS

Office Action issued in TW Patent Application No. 109114779, Sep. 19, 2023, translation.

(Continued)

*Primary Examiner* — David Sample
(74) *Attorney, Agent, or Firm* — GREENBLUM & BERNSTEIN, P.L.C.

(57) ABSTRACT

[Problem] To provide glass having a colored layer.
[Solution] Glass having a colored layer.

19 Claims, 18 Drawing Sheets

(56) References Cited

U.S. PATENT DOCUMENTS

2003/0138639 A1* 7/2003 Setten .................... B05D 5/06
                                                        428/426
2005/0011228 A1   1/2005 Hayashi et al.
2008/0216514 A1   9/2008 Hayashi et al.

OTHER PUBLICATIONS

International Search Report issued in International Bureau of WIPO Patent Application No. PCT/JP2020/018279, dated Jun. 16, 2020, along with an English translation thereof.
Office Action issued in CN Patent Application No. 202080033697.6, May 31, 2023, translation.
IPRP issued in WIPO Patent Application No. PCT/JP2020/018279, dated Nov. 16, 2021, translation.
Office Action issued in JP Patent Application No. 2021-519371, mailed Apr. 2, 2024, translation.

\* cited by examiner

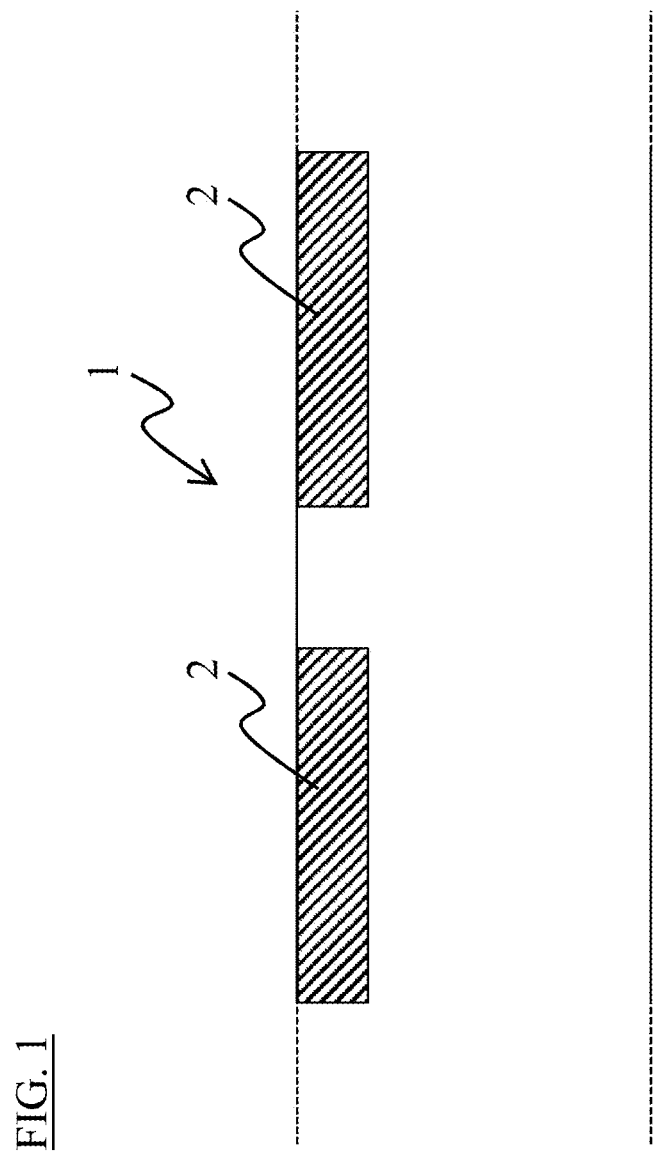

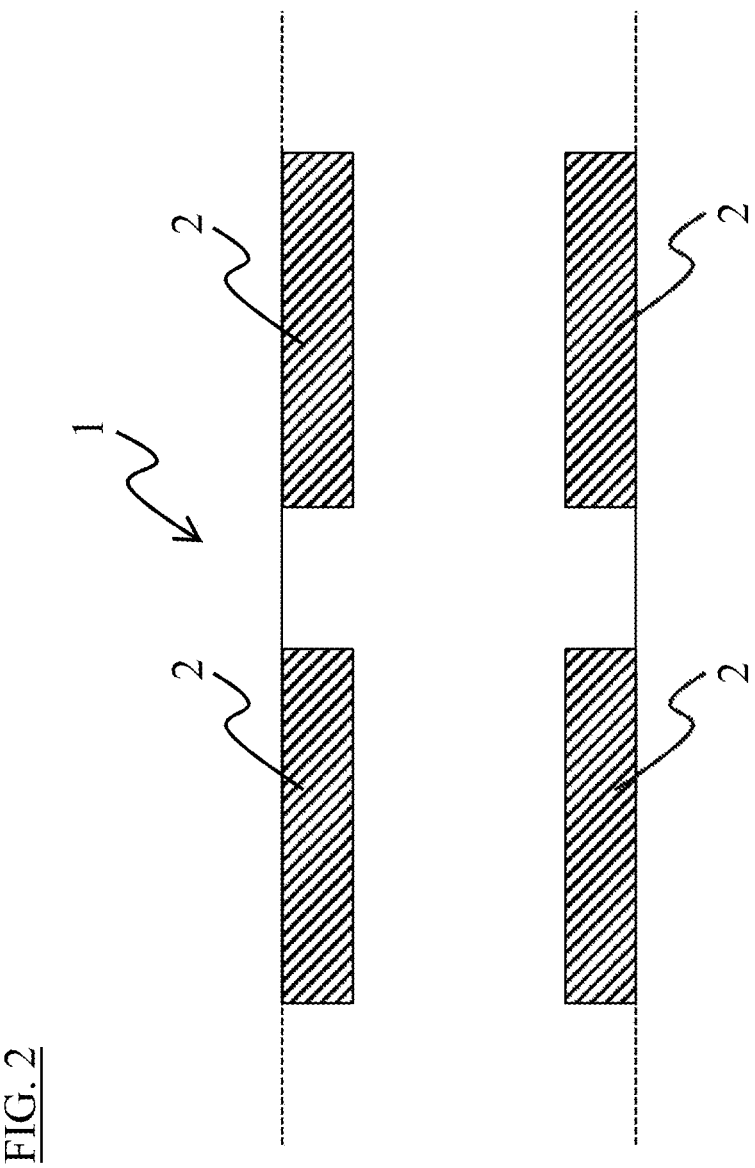

Fig. 13

| Examples | 4-1 | 4-2 | 4-3 | 4-4 |
|---|---|---|---|---|
| Thickness of colored layer (μm) | 46 (#1000 polished surface) 42 (optically polished surface) | 29 | 84 | 109 |
| OD (1100 nm) | - | 0.69 | 4.22 | 20 |

GLASS INCLUDING A SMALL-TRANSMITTANCE PORTION AND A LARGE-TRANSMITTANCE PORTION

TECHNICAL FIELD

The present invention relates to glass including a colored layer.

BACKGROUND ART

Patent Document 1 discloses an invention in which a transmittance of glass is changed by subjecting the glass to a heat treatment in an oxidizing atmosphere or a non-oxidizing atmosphere. However, Patent Document 1 does not disclose a configuration in which the colored layer is formed in the glass.

CITATION LIST

Patent Document

Patent Document 1: JP 2002-201041 A

DISCLOSURE OF THE INVENTION

Problem to be Solved by the Invention

An object of the present invention is to provide glass including a colored layer.

Means for Solving Problem

The gist of the present invention is as follows.
(1) Glass including a colored layer.
(2) The glass according to (1), in which the glass includes a small-transmittance portion and a large-transmittance portion.
(3) The glass according to (1) or (2), in which the glass includes Bi ion as a glass component.
(4) The glass according to any one of (1) to (3), in which the glass is phosphate glass.
(5) The glass according to any one of (1) to (4), in which the glass has a refractive index of 1.70 or more.
(6) An optical element formed from the glass according to any one of (1) to (5).

Effect of the Invention

According to the present invention, it is possible to provide glass including a colored layer.

BRIEF DESCRIPTION OF DRAWINGS

FIG. 1 is a schematic view showing an example of an embodiment of the present invention;
FIG. 2 is a schematic view showing an example of the embodiment of the present invention;
FIG. 3-1 is a schematic view showing an example of the embodiment of the present invention;
FIG. 3-2 is a schematic view showing the embodiment in FIG. 3-1;
FIG. 5-1 is an image showing a sample according to Example 1-1 and a scale for reference;
FIG. 5-2 is an image showing a sample according to Example 1-2 and a scale for reference;
FIG. 6-1 is a graph showing a transmittance of a portion including a colored layer in the sample according to Example 1-1;
FIG. 6-2 is a graph showing a transmittance of the portion including a colored layer in the sample according to Example 1-2;
FIG. 6-3 is a graph showing a transmittance of the portion including a colored layer in the sample according to Example 1-3;
FIG. 7-1 is a graph showing a transmittance of the portion including a colored layer in the sample according to Example 2-1 in accordance with the film thickness of a metal film;
FIG. 7-2 is a graph showing a transmittance of the portion including a colored layer in the sample according to Example 2-2 in accordance with the film thickness of a metal film;
FIG. 13 represents results and photomicrographs of cross-sections of portions including the colored layer of samples according to Examples 4-1 to 4-4.

DETAILED DESCRIPTION OF THE INVENTION

In an embodiment, glass according to the present invention will be described on the basis of a content ratio of each component in terms of cation %. Accordingly, hereinafter, with regard to each content, "%" represents "cation %" unless otherwise stated.

Expression of cation % represents molar percentage when a total content of all cation components is set as 100%. In addition, a total content represents a total content of a plurality of kinds of cation components (also including a case where the content is 0%). In addition, a cation ratio represents a ratio of contents of cation components (also including a total content of a plurality of kinds of cation components) in expression of cation %.

The content of a glass component can be quantified by a known method, for example, methods such as inductively coupled plasma atomic emission spectrometry (ICP-AES), inductively coupled plasma mass spectrometry (ICP-MS), etc. In addition, in this specification and the present invention, description of "the content of a constituent component is 0%" represents that the constituent component is substantially not contained, and the component is allowed to be contained at an unavoidable impurity level.

In addition, in this specification, a refractive index represents a refractive index nd at a d-line (wavelength: 587.56 nm) of yellow helium unless otherwise stated.

Hereinafter, an embodiment of the present invention will be described in detail.

Glass according to the present embodiment includes a colored layer. The colored layer is a portion where glass is colored, and preferably exists in a layer shape from a glass surface toward the inside.

In the glass according to the present embodiment, the colored layer may exist to cover the entirety of the glass surface (on the entire surface of the glass) or may exist to cover a part of the glass surface (on a part of the glass surface).

The colored layer is a portion in which a transmittance of light incident to the glass is small. Accordingly, in the glass according to the present embodiment, in light incident to the glass, a part or the entirety of light incident to the colored layer is absorbed, and thus an intensity of transmitted light is further attenuated in comparison to light that is not incident to the colored layer. That is, the glass according to the present embodiment can include a small-transmittance portion and a large-transmittance portion.

In the glass according to the present embodiment, the colored layer can be removed by grinding or polishing. In the glass according to the present embodiment, a transmittance of the glass after removing the colored layer becomes larger than a transmittance before removing the colored layer.

Figures 1, 3:
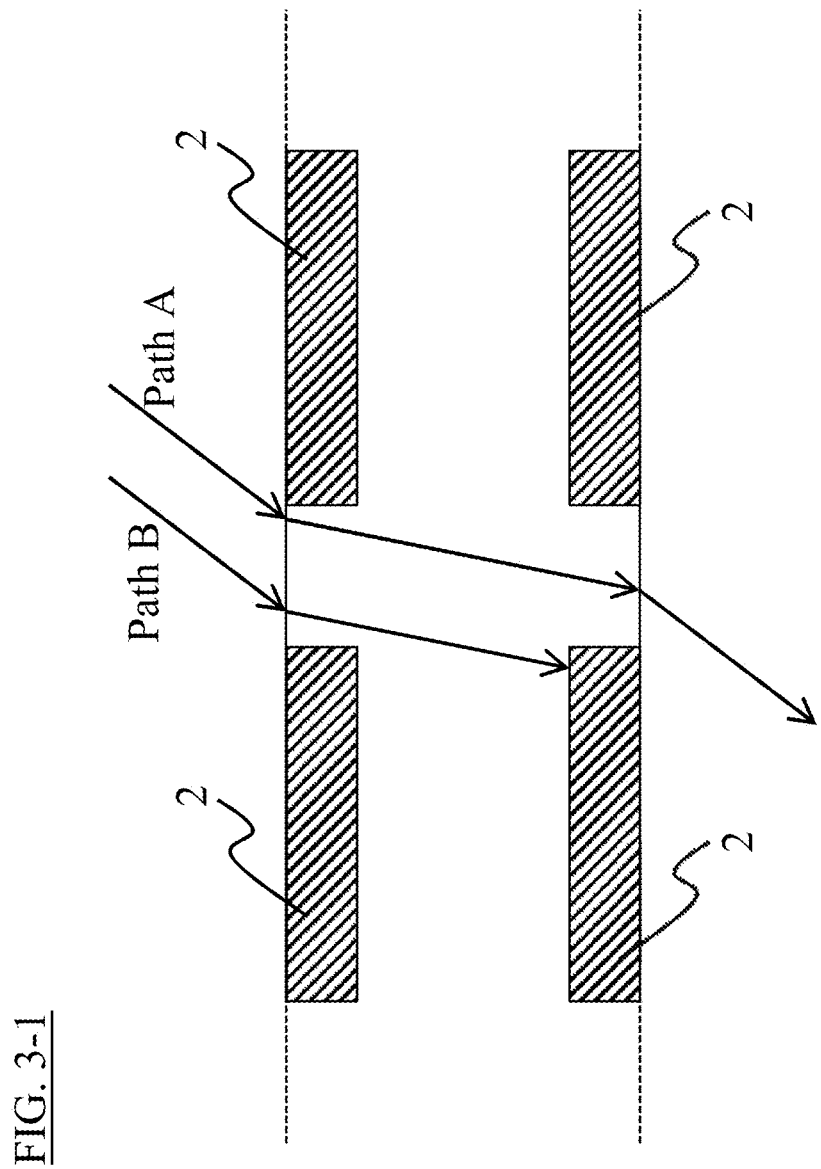
Figures 2, 3:
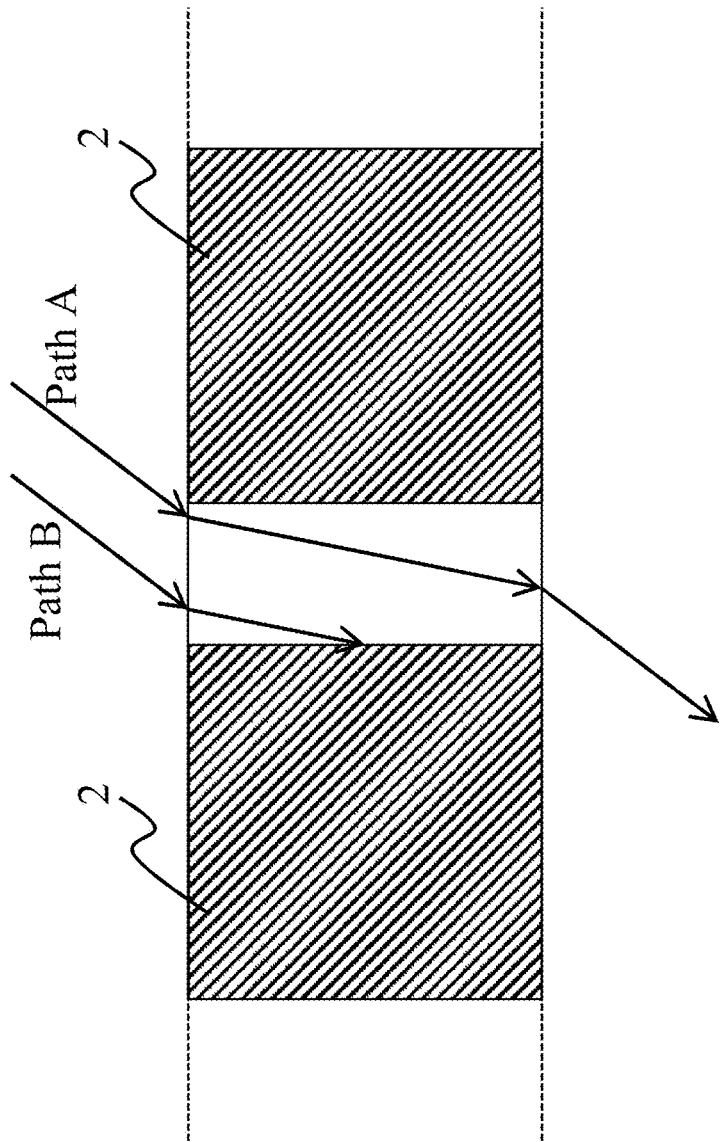

In the present embodiment, for example, in the case of glass including two opposing surfaces, as shown in FIG. 1, a colored layer 2 may be formed only on one surface side of a glass main body 1, or may be formed on both surface sides as shown in FIG. 2.

In addition, as shown in FIG. 3-1, when the colored layer is selectively formed on glass surfaces, light can be shielded at a portion where the colored layer exists, and light can be transmitted through a portion where the colored layer does not exist. Then, for example, when forming the colored layer in a specific pattern, it is possible to impart a function such as a slit, an aperture, and a pinhole to the glass.

In FIG. 3-1, since the colored layer 2 does not exist in a path A of light, light passes from one surface to the other surface. Since the colored layer 2 exists in a path B, light is absorbed by the colored layer 2, and since the colored layer 2 has the same composition as a non-colored portion, a difference in a refractive index does not exist inside the glass, and light is not reflected at a boundary between the colored layer 2 and the non-colored portion. In this case, with regard to transmission of light, as shown in FIG. 3-2, the same effect as in a case where the colored layer 2 is provided over the entirety of the glass in a thickness direction is obtained. Note that, as is well known, on a surface of the glass, a relationship between an incident angle and a refractive angle is determined in accordance with a refractive index of the glass and a refractive index of a medium (for example, air) that is in contact with the glass. A region where the colored layer is formed in a glass surface, a width of a slit, a diameter of an aperture, and the like may be determined in consideration of the relationship.

As will be described later, the glass according to the present embodiment can be used as an optical element. From the viewpoint of using the glass as the optical element, the glass according to the present embodiment is preferably an optical glass. However, since the glass according to the present embodiment can be used as a decorative material, an exterior of a small-sized electronic device, or the like by taking advantage of decorativeness of the colored layer, the glass is not limited to optical glass.

In the glass according to the present embodiment, the colored layer and the non-colored portion have the same glass component composition. However, the valence of the glass component (cation) may be different between the colored layer and the non-colored portion.

A coloration color of the colored layer is preferably a reduced color caused by a glass component, and more preferably a reduced color caused by a transition metal. Examples of the transition metal include Ti, Nb, W, and Bi. Accordingly, the glass according to the present embodiment contains at least one ion selected from the group consisting of Ti ion, Nb ion, W ion, and Bi ion as the glass component, and more preferably Bi ion.

(Thickness of Colored Layer)

The thickness of the colored layer is not particularly limited, but the thickness is preferably 1 to 300 μm, more preferably 20 to 200 and still more preferably 30 to 150 μm.

(OD)

In the glass according to the present embodiment, a spectral transmittance of the colored layer in a wavelength region ranging from a visible region (wavelength region of 400 to 760 nm) to an infrared region shows an increasing tendency as a wavelength becomes longer. On the other hand, OD of the colored layer shows a decreasing tendency as the wavelength becomes longer. OD is an optical density or an optical concentration, and as expressed by the following Expression, OD is expressed as a numerical value obtained by applying a negative sign (minus) to a common logarithm of an incident light intensity $I_0$ and a transmitted light intensity I.

$$OD=-\log_{10}(I/I_0)$$

In a case where the glass according to the present embodiment includes the colored layer and the non-colored portion in which a transmittance in the visible region is large, OD of the colored layer becomes large, and OD of the non-colored portion becomes small. In measurement of OD, in a case where measurement light passes through both the colored layer and the non-colored portion, since OD of the non-colored portion is sufficiently small, OD of the colored layer becomes dominant.

In the glass according to the present embodiment, OD of a portion including the colored layer at a wavelength of 1100 nm is preferably 1.0 or more, and more preferably 1.5 or more. On the other hand, OD of the non-colored portion at a wavelength of 1100 nm is preferably 0.15 or less, and more preferably 0.1 or less.

Typically, a sensitivity region of an optical sensor such as a CCD and a C-MOS sensor ranges from a visible region to the vicinity of 1100 nm. When the colored layer having OD in the above-mentioned range is provided, glass capable of shielding light over the entirety of the sensitivity region of the optical sensor is obtained. Accordingly, it is preferable that the glass according to the present embodiment can control a transmittance with respect to light beams in a wavelength region from a visible region to 1100 nm.

Note that, in the glass including two opposing surfaces, OD in the case of providing the colored layer in both the surfaces becomes approximately two times OD in a case where the same colored layer is provided only in a single surface.

In addition, in the glass according to the present embodiment, in a wavelength region ranging from a visible region to a near infrared region, OD deceases as a wavelength becomes longer. Accordingly, in a portion including the colored layer, for example, OD at a wavelength of 780 nm becomes larger than OD at a wavelength of 1100 nm.

Accordingly, in a case where a wavelength region desired to be shielded exists, OD at a wavelength on a long wavelength side in the wavelength region is designed to be high. In the case of designing glass that shields only visible light, OD may be set to be higher on a long wavelength side (for example, 780 nm) of the visible region. In addition, in the case of designing glass that shields light from the visible region to the near infrared region, OD may be set to be high at a wavelength in the near infrared region (for example, a wavelength of 1100 nm). OD can be controlled by adjusting the thickness of the colored layer or the degree of coloration.

(ΔOD)

As described above, in a case where the glass according to the present embodiment includes the colored layer and the non-colored portion in which a transmittance in the visible region is large, OD of the colored layer becomes large, and OD of the non-colored portion becomes small. That is, when the colored layer is gradually removed in the thickness direction, OD varies in accordance with the amount of removal.

With regard to the glass including the colored layer according to the present embodiment, OD at a predetermined wavelength is set as OD1 and the thickness is set as T1. When a predetermined amount of the colored layer is removed in the thickness direction by polishing or the like, OD at the same wavelength is set as OD2 and the thickness is set as T2. At this time, the amount of variation ΔOD of OD per unit thickness is calculated by the following Expression.

$$\Delta OD = (OD1 - OD2)/(T1 - T2)$$

In the case of measuring ΔOD regarding OD at a wavelength of 1100 nm or longer, it is preferable to remove the colored layer by 5 to 20 µm each time in the thickness direction. In addition, in the case of measuring ΔOD regarding OD at a wavelength shorter than 1100 nm, it is preferable to remove the colored layer by 3 to 10 µm each time in the thickness direction. Then, OD measurement and removal of the colored layer are repeated, and ΔOD corresponding to the amount of removal of the colored layer is calculated. For example, when removal of the colored layer is repeated and the amount of removal of the colored layer in the thickness direction totally becomes 20 µM, (T1−T2) in Expression described above becomes 20.

After the colored layer cannot be visually recognized as a result of repeating removal of the colored layer, removal is further repeated two or three times with respect to the portion where the colored layer exists so that approximately 50 µm is finally further removed. Whenever the colored layer is removed, OD and the thickness of the glass are measured, and ΔOD is calculated.

Alternatively, after OD becomes less than 0.15 as a result of repetitive removal of the colored layer, the portion where the colored layer exists is further removed a plurality of times in the thickness direction, the colored layer being removed by 10 µm or more each time. Whenever the colored layer is removed by 10 µm or more in the thickness direction, OD and the thickness of the glass are measured, and ΔOD is calculated.

In the glass according to the present embodiment, in a case where ΔOD is preferably 0.04 or more, 0.05 or more, 0.07 or more, 0.09 or more, 0.12 or more, 0.15 or more, 0.18 or more, 0.20 or more, 0.25 or more, 0.30 or more, 0.34 or more, or 0.35 or more at wavelengths of 1100 nm and 780 nm, it can be evaluated that the colored layer remains. In addition, in a case where ΔOD is preferably 0.025 or less, 0.023 or less, 0.020 or less, 0.017 or less, 0.015 or less, or 0.010 or less at wavelength of 1100 nm and 780 nm, it can be evaluated that the colored layer has been removed.

In the glass according to the present embodiment, a boundary between the colored layer and the non-colored portion is clear. Here, the boundary between the colored layer and the non-colored portion is a region ranging from a portion where the degree of coloration in the colored layer becomes weak to a portion where coloration is sufficiently reduced. The degree of coloration can be evaluated by OD at a predetermined wavelength. Accordingly, a state in which the degree of coloration varies in the vicinity of the boundary can be confirmed by ΔOD. That is, if a region in which OD varies significantly depending on the amount of removal in the colored layer can be confirmed by ΔOD, the region can be set as the boundary between the colored layer and the non-colored portion.

In the glass according to the present embodiment, the boundary between the colored layer and the non-colored portion in the thickness direction can be set within a range of several tens of µm. Accordingly, when observing a cross-section of the glass according to the present embodiment with an optical microscope or the like, the boundary between the colored layer and the non-colored portion can be visually recognized in a relatively clear manner.

Accordingly, in the glass according to the present embodiment, for example, a region where ΔOD is 0.04 or more can be regarded as the boundary between the colored layer and the non-colored portion. In addition, a region where ΔOD is 0.04 or more, 0.05 or more, 0.07 or more, 0.09 or more, 0.12 or more, 0.15 or more, 0.18 or more, 0.20 or more, 0.25 or more, 0.30 or more, 0.34 or more, or 0.35 or more may be set as the boundary between the colored layer and the non-colored portion. Then, in the glass according to the present embodiment, the thickness of the region is preferably 40 µm or less, and more preferably 30 µm or less, 20 µm or less, 10 µm or less, or 5 µm or less in this order.

(Refractive Index)

In the glass according to the present embodiment, the refractive index nd is preferably 1.70 or more, and more preferably 1.73 or more, 1.75 or more, 1.76 or more, 1.77 or more, 1.78 or more, 1.79 or more, or 1.80 or more in this order. Although not particularly limited, the upper limit of the refractive index nd is typically 2.5, and is preferably 2.3.

Figure 4:
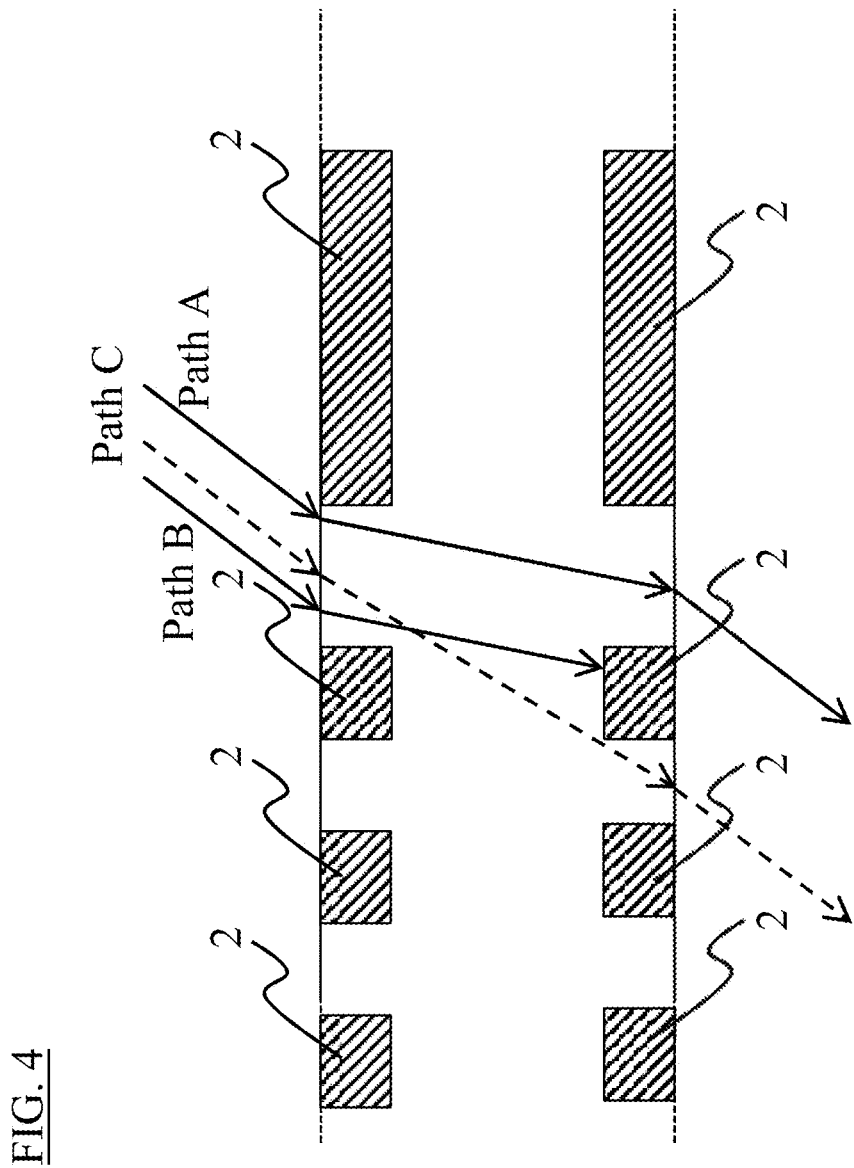
FIG. 4 is a schematic view showing an example of the embodiment of the present invention.

FIG. 4 shows glass including two opposing surfaces in which a plurality of colored layers is provided with predetermined intervals at portions where both surfaces oppose each other so that a portion where the colored layer is not formed functions as a slit. In this case, in a case where an incident angle of light beams incident to a slit portion is large (a light beam is incident at a shallow angle) when a refractive index of glass is low, as in a path C, the light beam is transmitted through slits adjacent to each other, and thus there is a concern that the same effect as in the element shown in FIG. 3-2 cannot be obtained. When the refractive index of glass is high as in the above-described range, a light beam is absorbed by the colored layer formed in a rear surface of glass as in the path B, and the light beam is not transmitted through the adjacent slits, and thus an interval between the slits can be narrowed.

(Average Linear Expansion Coefficient)

In the glass according to the present embodiment, an average linear expansion coefficient is preferably $50 \times 10^{-7} K^{-1}$ or more, and more preferably $60 \times 10^{-7} K^{-1}$ or more, $70 \times 10^{-7} K^{-1}$ or more, $75 \times 10^{-7} K^{-1}$ or more, $80 \times 10^{-7} K^{-1}$ or more, $85 \times 10^{-7} K^{-1}$ or more, or $90 \times 10^{-7} K^{-1}$ or more in this order. Although not particularly limited, the upper limit of the average linear expansion coefficient is typically $200\times10^{-7}K^{-1}$, and preferably $150\times10^{-7}K^{-1}$. When the average linear expansion coefficient is set within the above-described range, the strength of glass can be increased when being chemically strengthened.

A method of measuring the average linear expansion coefficient conforms to Japanese Optical Glass Industrial Standards JOGIS 08-2003 "Measuring Method for Thermal Expansion of Optical Glass". However, a diameter of a round rod-shaped sample is set to 5 mm.

(Acid Durability Da)

In the glass according to the present embodiment, a grade of an acid durability Da is preferably Grade 1 to 2, and more preferably Grade 1.

The acid durability Da is measured in conformity to definition of Japanese Optical Glass Industrial Standards JOGIS 06-2009. Specifically, powdered glass (particle size: 425 to 600 µm) corresponding to weight of specific gravity is put into a platinum basket, is immersed in a quartz-glass round-bottom flask containing 0.01 mol/L nitric acid aqueous solution, and is subjected to a treatment in a boiling water bath for 60 minutes, and a weight loss rate (%) before and after all the above treatment is measured. A grade in accordance with the acid durability Da is shown in Table A.

TABLE A

| Grade | Weigt loss rate (%) |
|---|---|
| 1 | Less than 0.20 |
| 2 | 0.20 or more and less than 0.35 |
| 3 | 0.35 or more and less than 0.65 |
| 4 | 0.65 or more and less than 1.20 |
| 5 | 1.20 or more and less than 2.20 |
| 6 | 2.20 or more |

(Glass Composition)

Non-limiting examples of a composition of the glass according to the present embodiment will be described below.

The glass according to the present embodiment is preferably phosphate glass. The phosphate glass represents glass that mainly contains $P^{5+}$ as a glass network forming component. As the glass network forming component, $P^{5+}$, $B^{3+}$, $Si^{4+}$, $Al^{3+}$, and the like are known. Here, description of "mainly containing phosphate as the glass network forming component" represents that the content of $P^{5+}$ is larger than the content of any of $B^{3+}$, $Si^{4+}$, and $Al^{3+}$. In the case of the phosphate glass, the degree of coloration in the colored layer can be raised.

In the glass according to the present embodiment, the lower limit of the content of $P^{5+}$ is preferably 10%, and more preferably 13%, 15%, 17%, or 20% in this order. In addition, the upper limit of the content of $P^{5+}$ is preferably 50%, and more preferably 45%, 40%, 38%, 35%, 33%, or 30% in this order.

$P^{5+}$ is the glass network forming component. On the other hand, when excessively containing $P^{5+}$, meltability deteriorates. Accordingly, the content of $P^{5+}$ is preferably within the above-described range.

In the glass according to the present embodiment, the upper limit of the content of $B^{3+}$ is preferably 30%, and more preferably 25%, 20%, 15%, 13%, or 10% in this order. In addition, the lower limit of the content of $B^{3+}$ is preferably 0.1%, and more preferably 0.5%, 1%, 3%, or 5% in this order. The content of $B^{3+}$ may be 0%.

$B^{3+}$ is the glass network forming component, and has an operation of improving meltability of glass. On the other hand, when the content of $B^{3+}$ is excessively large, chemical durability may tend to decrease. Accordingly, the content of $B^{3+}$ is preferably within the above-described range.

In the glass according to the present embodiment, the upper limit of a cation ratio $[B^{3+}/P^{5+}]$ of the content of $B^{3+}$ to the content of $P^{5+}$ is preferably 0.70, and more preferably 0.60, 0.55, or 0.50 in this order. The cation ratio $[B^{3+}/P^{5+}]$ may be 0.

In the glass according to the present embodiment, the upper limit of the content of $Si^{4+}$ is preferably 10%, and more preferably 7%, 5%, 3%, 2%, or 1% in this order. In addition, the lower limit of the content of $Si^{4+}$ is preferably 0.1%, and more preferably 0.2%, 0.3%, 0.4%, or 0.5% in this order. The content of $Si^{4+}$ may be 0%.

$Si^{4+}$ is the glass network forming component, and has an operation of improving thermal stability, chemical durability, and weather resistance of glass. On the other hand, when the content of $Si^{4+}$ is excessively large, meltability of glass tends to deteriorate, and a glass raw material tends to remain in a non-molten state. Accordingly, the content of $Si^{4+}$ is preferably within the above-described range.

In the glass according to the present embodiment, the upper limit of the content of $Al^{3+}$ is preferably 10%, and more preferably 7%, 5%, 3%, or 1% in this order. The content of $Al^{3+}$ may be 0%.

$Al^{3+}$ has an operation of improving chemical durability, and weather resistance of glass. On the other hand, when the content of $Al^{3+}$ is excessively large, thermal stability of glass is likely to deteriorate, and a glass transition temperature Tg is likely to rise, and meltability is likely to deteriorate. Accordingly, the content of $Al^{3+}$ is preferably within the above-described range.

In the glass according to the present embodiment, the lower limit of a total content $[P^{5+}+B^{3+}+Si^{4+}+Al^{3+}]$ of $P^{5+}$, $B^{3+}$, $Si^{4+}$, and $Al^{3+}$ is preferably 10%, and more preferably 15%, 18%, 20%, 23%, or 25% in this order. In addition, the upper limit of the total content $[P^{5+}+B^{3+}+Si^{4+}+Al^{3+}]$ is preferably 60%, and more preferably 50%, 45%, 40%, 37%, or 35% in this order.

The glass according to the present embodiment preferably contains a transition metal as a glass component, more preferably at least one glass component selected from the group consisting of Ti ion, Nb ion, Bi ion, and W ion, and still more preferably Bi ion.

In the glass according to the present embodiment, the lower limit of the content of Ti ion is preferably 1%, and more preferably 2% or 3% in this order. In addition, the upper limit of the content of Ti ion is preferably 45%, and more preferably 40%, 35%, 30%, 25%, 20%, 15%, or 12% in this order. Here, it is assumed that Ti ion includes all Ti ions different in a valency in addition to $Ti^{4+}$ and $Ti^{3+}$.

As in Nb ion, W ion, and Bi ion, Ti ion greatly contributes to high refractive index and has an operation of increasing coloration of glass. On the other hand, when the content of Ti ion is excessively large, meltability of glass tends to deteriorate, and a glass raw material tends to remain in a non-molten state. Accordingly, the content of Ti ion is preferably within the above-described range.

In the glass according to the present embodiment, the lower limit of the content of Nb ion is preferably 1%, and more preferably 5%, 10%, or 15% in this order. In addition, the upper limit of the content of Nb ion is preferably 45%, and more preferably 40%, 35%, 30%, 25%, 23%, or 20% in this order. It is assumed that Nb ion includes all Nb ions different in a valency in addition to $Nb^{5+}$.

Nb ion is a component that contributes to high refractive index and increases coloration of glass. In addition, Nb ion has an operation of improving thermal stability and chemical durability of glass. On the other hand, when the content of Nb ion is excessively large, thermal stability of glass tends to deteriorate. Accordingly, the content of Nb ion is preferably within the above-described range.

In the glass according to the present embodiment, the upper limit of the content of W ion is preferably 30%, and more preferably 25%, 20%, 15%, or 13% in this order. In addition, the lower limit of the content of W ion is preferably 0.5%, and more preferably 1%, 2%, or 3% in this order. It is assumed that W ion includes all W ions different in a valency in addition to $W^{6+}$.

W ion contributes to a high refractive index, and has an operation of increasing coloration of glass. Accordingly, the content of W ion is preferably within the above-described range.

In the glass according to the present embodiment, the upper limit of the content of Bi ion is preferably 40%, and more preferably 35%, 30%, 28%, or 25% in this order. In addition, the lower limit of the content of Bi ion is preferably 0.5%, and more preferably 1%, 2%, or 2.5% in this order. It is assumed that Bi ion includes all Bi ions different in a valency in addition to $Bi^{3+}$.

Bi ion contributes to a high refractive index, and has an operation of increasing coloration of glass. Accordingly, the content of Bi ion is preferably within the above-described range.

In the glass according to the present embodiment, the lower limit of a total content [Ti+Nb+W] of Ti ion, Nb ion, and W ion is preferably 1%, and more preferably 5%, 10%, 15%, 20%, or 23% in this order. In addition, the upper limit of the total content [Ti+Nb+W] is preferably 60%, and more preferably 55%, 50%, 45%, 40%, 38%, or 35% in this order.

In the glass according to the present embodiment, the upper limit of a total content [Ti+Nb+W+Bi] of Ti ion, Nb ion, W ion, and Bi ion is preferably 80%, and more preferably 75%, 70%, 68%, or 65% in this order. In addition, the lower limit of the total content [Ti+Nb+W+Bi] is preferably 1%, and more preferably 5%, 10%, 15%, 20%, 23%, or 25% in this order.

In the glass according to the present embodiment, the lower limit of a cation ratio $[(Ti+Nb+W+Bi)/(P^{5+}+B^{3+}+Si^{4+})]$ of the total content of Ti ion, Nb ion, W ion, and Bi ion to the total content of $P^{5+}$, $B^{3+}$, and $Si^{4+}$ is preferably 0.1, and more preferably 0.3, 0.5, 0.6, or 0.7 in this order. In addition, the upper limit of the cation ratio $[(Ti+Nb+W+Bi)/(P^{5+}+B^{3+}+Si^{4+})]$ is preferably 4.0, and more preferably 3.5, 3.0, 2.7, or 2.5 in this order.

In the glass according to the present embodiment, the upper limit of the content of $Ta^{5+}$ is preferably 5%, and more preferably 3%, 2%, or 1% in this order. The content of $Ta^{5+}$ may be 0%.

$Ta^{5+}$ has an operation of improving thermal stability of glass. On the other hand, when the content of $Ta^{5+}$ is excessively large, the refractive index of glass tends to decrease, and meltability tends to decrease. Accordingly, the content of $Ta^{5+}$ is preferably within the above-described range.

In the glass according to the present embodiment, the upper limit of the content of $Li^+$ is preferably 35%, and more preferably 30%, 27%, 25%, 23%, or 20% in this order. In addition, the lower limit of the content of $Li^+$ is preferably 1%, and more preferably 2%, 3%, 5%, or 8% in this order. The content of $Li^+$ may be 0%.

In the glass according to the present embodiment, the upper limit of the content of $Na^+$ is preferably 40%, and more preferably 35%, 30%, 25%, 20%, or 18% in this order.

In addition, the lower limit of the content of $Na^+$ is preferably 0.5%, and more preferably 1%, 1.5%, 3%, or 5% in this order. The content of $Na^+$ may be 0%.

When glass contains $Li^+$ or $Na^+$, chemical strengthening is easily performed on the glass. On the other hand, when the content of $Li^+$ or $Na^+$ is excessively large, there is a concern that thermal stability of the glass may deteriorate. Accordingly, the content of each of $Li^+$ and $Na^+$ is preferably within the above-described range.

In the glass according to the present embodiment, the upper limit of a total content $[Li^++Na^+]$ of $Li^+$ and $Na^+$ is preferably 45%, and more preferably 43%, 40%, or 38% in this order. In addition, the lower limit of the total content $[Li^++Na^+]$ is preferably 1%, and more preferably 5%, 10%, 15%, or 20% in this order.

In the glass according to the present embodiment, the upper limit of the content of $K^+$ is preferably 20%, and more preferably 15%, 13%, 10%, 8%, 5%, or 3% in this order. In addition, the lower limit of the content of $K^+$ is preferably 0.1%, and more preferably 0.5%, 1.0%, or 1.2% in this order. The content of $K^+$ may be 0%.

$K^+$ has an operation of improving thermal stability of glass. On the other hand, when the content of $K^+$ is excessively large, thermal stability tends to decrease. Accordingly, the content of $K^+$ is preferably within the above-described range.

In the glass according to the present embodiment, the upper limit of the content of $Rb^+$ is preferably 5%, and more preferably 3%, 1%, or 0.5% in this order. The content of $Rb^+$ may be 0%.

In the glass according to the present embodiment, the upper limit of the content of $Cs^+$ is preferably 5%, and more preferably 3%, 1%, or 0.5% in this order. The content of $Cs^+$ may be 0%.

$Rb^+$ and $Cs^+$ have an operation of improving meltability of glass. On the other hand, when the contents are excessively large, there is a concern that the refractive index nd may decrease, and the volatility of a glass component during melting may increase. Accordingly, the content of each of $Rb^+$ and $Cs^+$ is preferably within the above-described range.

In the glass according to the present embodiment, the upper limit of the content of $Mg^{2+}$ is preferably 15%, and more preferably 10%, 5%, 3%, or 1% in this order. The content of $Mg^{2+}$ may be 0%.

In the glass according to the present embodiment, the upper limit of the content of $Ca^{2+}$ is preferably 15%, and more preferably 10%, 5%, 3%, or 1% in this order. The content of $Ca^{2+}$ may be 0%.

In the glass according to the present embodiment, the upper limit of the content of $Sr^{2+}$ is preferably 15%, and more preferably 10%, 5%, 3%, or 1% in this order. The content of $Sr^{2+}$ may be 0%.

In the glass according to the present embodiment, the upper limit of the content of $Ba^{2+}$ is preferably 25%, and more preferably 20%, 18%, 15%, 10%, or 5% in this order. The content of $Ba^{2+}$ may be 0%.

Any of $Mg^{2+}$, $Ca^{2+}$, $Sr^{2+}$, and $Ba^{2+}$ has an operation of improving thermal stability and meltability of glass. On the other hand, when the contents are excessively large, there is a concern that high-refractive-index characteristics may be damaged, and thermal stability of glass may deteriorate. Accordingly, the contents of the glass components are preferably within the above-described ranges.

In the glass according to the present embodiment, the upper limit of a total content $[Mg^{2+}+Ca^{2+}+Sr^{2+}+Ba^{2+}]$ of $Mg^{2+}$, $Ca^{2+}$, $Sr^{2+}$, and $Ba^{2+}$ is preferably 30%, and more preferably 25%, 20%, 18%, 15%, 10%, or 5% in this order.

In the glass according to the present embodiment, the upper limit of the content of $Zn^{2+}$ is preferably 15%, and more preferably 10%, 8%, 5%, 3%, or 1% in this order. In addition, the lower limit of the content of $Zn^{2+}$ is preferably 0.1%, and more preferably 0.3% or 0.5% in this order. The content of $Zn^{2+}$ may be 0%.

$Zn^{2+}$ has an operation of improving thermal stability of glass. On the other hand, when the content of $Zn^{2+}$ is excessively large, there is a concern that meltability may deteriorate. Accordingly, the content of $Zn^{2+}$ is preferably within the above-described range.

In the glass according to the present embodiment, the upper limit of the content of $Zr^{4+}$ is preferably 5%, and more preferably 3%, 2%, or 1% in this order. The content of $Zr^{4+}$ may be 0%.

$Zr^{4+}$ has an operation of improving thermal stability of glass. On the other hand, when the content of $Zr^{4+}$ is excessively large, thermal stability and meltability of glass tend to deteriorate. Accordingly, the content of $Zr^{4+}$ is preferably within the above-described range.

In the glass according to the present embodiment, the upper limit of the content of $Ga^{3+}$ is preferably 3%, and more preferably 2% or 1% in this order. In addition, the lower limit of the content of $Ga^{3+}$ is preferably 0%. The content of $Ga^{3+}$ may be 0%.

In the glass according to the present embodiment, the upper limit of the content of $In^{3+}$ is preferably 3%, and more preferably 2% or 1% in this order. In addition, the lower limit of the content of $In^{3+}$ is preferably 0%. The content of $In^{3+}$ may be 0%.

In the glass according to the present embodiment, the upper limit of the content of $Sc^{3+}$ is preferably 3%, and more preferably 2% or 1% in this order. In addition, the lower limit of the content of $Sc^{3+}$ is preferably 0%. The content of $Sc^{3+}$ may be 0%.

In the glass according to the present embodiment, the upper limit of the content of $Hf^{4+}$ is preferably 3%, and more preferably 2% or 1% in this order. In addition, the lower limit of the content of $Hf^{4+}$ is preferably 0%. The content of $Hf^{4+}$ may be 0%.

In the glass according to the present embodiment, the upper limit of the content of $Lu^{3+}$ is preferably 3%, and more preferably 2% or 1% in this order. In addition, the lower limit of the content of $Lu^{3+}$ is preferably 0%. The content of $Lu^{3+}$ may be 0%.

In the glass according to the present embodiment, the upper limit of the content of $Ge^{4+}$ is preferably 3%, and more preferably 2% or 1% in this order. In addition, the lower limit of the content of $Ge^{4+}$ is preferably 0%. The content of $Ge^{4+}$ may be 0%.

In the glass according to the present embodiment, the upper limit of the content of $La^{3+}$ is preferably 5%, and more preferably 4% or 3% in this order. The lower limit of the content of $La^{3+}$ is preferably 0%. The content of $La^{3+}$ may be 0%.

In the glass according to the present embodiment, the upper limit of the content of $Gd^{3+}$ is preferably 5%, and more preferably 4% or 3% in this order. In addition, the lower limit of the content of $Gd^{3+}$ is preferably 0%. The content of $Gd^{3+}$ may be 0%.

In the glass according to the present embodiment, the upper limit of the content of $Y^{3+}$ is preferably 5%, and more preferably 4% or 3% in this order. In addition, the lower limit of the content of $Y^{3+}$ is preferably 0%. The content of $Y^{3+}$ may be 0%.

In the glass according to the present embodiment, the upper limit of the content of $Yb^{3+}$ is preferably 3%, and more preferably 2% or 1% in this order. In addition, the lower limit of the content of $Yb^{3+}$ is preferably 0%. The content of $Yb^{3+}$ may be 0%.

The cation components of the glass according to the present embodiment preferably mainly include the above-described components, that is, $P^{5+}$, $B^{3+}$, $Si^{4+}$, $Al^{3+}$, Ti ion, Nb ion, W ion, Bi ion, $Ta^{5+}$, $Li^+$, $Na^+$, $K^+$, $Rb^+$, $Cs^+$, $Mg^{2+}$, $Ca^{2+}$, $Sr^{2+}$, $Ba^{2+}$, $Zn^{2+}$, $Zr^{4+}$, $Ga^{3+}$, $In^{3+}$, $Sc^{3+}$, $Hf^{4+}$, $Lu^{3+}$, $Ge^{4+}$, $La^{3+}$, $Gd^{3+}$, $Y^{3+}$, and $Yb^{3+}$, and the total content of these components is preferably 95% or more, more preferably 98% or more, still more preferably 99% or more, and still more preferably 99.5% or more.

The glass according to the present embodiment may contain components other than $F^-$ and $O^{2-}$ as an anion component. Examples of the anion component other than $F^-$ and $O^{2-}$ include $Cl^-$, $Br^-$, and $I^-$. However, $Cl^-$, $Br^-$, and $I^-$ are likely to volatilize during melting of glass. Due to volatilizing of these components, problems such as fluctuation in glass characteristics, deterioration of homogeneity of glass, and significant consumption of a melting facility, and the like occur. Accordingly, the content of $Cl^-$ is preferably less than 5 anion %, more preferably less than 3 anion %, still more preferably less than 1 anion %, still more preferably less than 0.5 anion %, and still more preferably less than 0.25 anion %. In addition, a total content of $Br^-$ and $I^-$ is preferably less than 5 anion %, more preferably less than 3 anion %, still more preferably less than 1 anion %, still more preferably less than 0.5 anion %, still more preferably less than 0.1 anion %, and still more preferably 0 anion %.

Note that, the anion % represents molar percentage when a total content of all anion components is set as 100%.

Basically, the glass according to the present embodiment is preferably constituted by the above-described components, but may contain the other components within a range not deteriorating the operational effect of the present invention.

For example, the glass according to the present embodiment may contain an appropriate amount of copper (Cu) as a glass component so as to impart near-infrared light absorption characteristics to the glass. In addition, V, Cr, Mn, Fe, Co, Ni, Pr, Nd, Pm, Sm, Eu, Tb, Dy, Ho, Er, Tm, Ce, and the like may be contained. These elements may increase coloration of glass and can be a generation source of fluorescence.

In addition, in the present invention, inclusion of unavoidable impurities is not excluded.

<Other Component Composition>

Any of Pb, As, Cd, Tl, Be, and Se has toxicity. Therefore, it is preferable that the glass according to the present embodiment does not contain these elements as a glass component.

Any of U, Th, and Ra is a radioactive element. Therefore, it is preferable that the glass according to the present embodiment does not contain these elements as a glass component.

$Sb^{3+}$, $Sn^{4+}$, and $Ce^{4+}$ are optionally additive glass components functioning as a clarifying agent. Among these, $Sb^{3+}$ is a clarifying agent having a large clarifying effect.

The content of $Sb^{3+}$ is expressed as mass % in outer percentage when converted into $Sb_2O_3$. Here, the content of $Sb^{3+}$ is expressed as the content of $Sb_2O_3$ in mass % in terms of outer percentage when content ratios of cation components other than $Sb^{3+}$, $Sn^{4+}$, and $Ce^{4+}$ are converted into oxides such as $Sb_2O_3$ and a total content ratio of all cation components other than $Sb^{3+}$, $Sn^{4+}$, and $Ce^{4+}$ is set to 100 mass %. The content of $Sb_2O_3$ is preferably less than 2 mass %, more preferably less than 1 mass %, still more preferably less than 0.5 mass %, still more preferably less than 0.2 mass %, still more preferably less than 0.1 mass %, and still more preferably less than 0.05 mass %. When the content of $Sb_2O_3$ is set within the above-described range, clarity of glass can be improved.

The content of each of $Sn^{4+}$ and $Ce^{4+}$ is also expressed in outer percentage when converted into an oxide. That is, the content of each of $Sn^{4+}$ and $Ce^{4+}$ is expressed as the content of $SnO_2$ and the content of $CeO_2$ in mass % in terms of outer percentage when content ratios of cation components other than $Sb^{3+}$, $Sn^{4+}$, and $Ce^{4+}$ are converted into content ratios in terms of oxides and a total content ratio of all cation components other than $Sb^{3+}$, $Sn^{4+}$, and $Ce^{4+}$ is set to 100 mass %. The content of each of $SnO_2$ and $CeO_2$ is preferably less than 2 mass %, more preferably less than 1 mass %, still more preferably less than 0.5 mass %, and still more preferably less than 0.1 mass %. The content of each of $SnO_2$ and $CeO_2$ may be 0 mass %. When the content of each of $SnO_2$ and $CeO_2$ is set within the above-described range, clarity of glass can be improved.

(Manufacture of Glass)

The glass according to the present embodiment is obtained by preparing non-colored glass and by forming a colored layer in the glass. The non-colored glass may be prepared by a known glass manufacturing method. For example, a plurality of kinds of compounds are combined and sufficiently mixed to obtain a batch raw material, and the batch raw material is put into a melting container and is melted, clarified, and homogenized. Then, molten glass is molded and slowly cooled to obtain glass. Alternatively, the batch raw material is put into the melting container and roughly melted (rough melting). The melt obtained by the rough melting is rapidly cooled and pulverized to prepare a cullet. Subsequently, the cullet may be put into the melting container and may be heated and remelted to obtain molten glass, and the molten glass may be molded after being clarified and homogenized, and may be slowly cooled to obtain glass. A known method may be applied to the molding and slow cooling of the molten glass.

Furthermore, a process of increasing the amount of moisture in the molten glass may be included in the manufacture of the glass according to the present embodiment. Examples of the process of increasing the amount of moisture in the molten glass include a process of adding water vapor to the atmosphere in melting and a process of bubbling a gas containing water vapor in the molten glass. Among these, it is preferable to include the process of adding water vapor to the atmosphere in melting. When including the process of increasing the amount of moisture in the molten glass, a βOH value of glass can be increased. When increasing the βOH value, glass having high transparency can be obtained.

(Formation of Colored Layer)

The colored layer can be formed by sticking a metal film on a glass surface and by performing a heat treatment in a reducing atmosphere.

As a metal that constitutes the metal film, a metal having an operation of occluding hydrogen ions in the atmosphere and reducing a glass component contained in glass through exchange of hydrogen ions and electrons is preferable. A metal having an operation of reducing a transition metal among glass components is more preferable. Specific examples include Ni, Au, Ag, Pt, Pd, a Pt—Pd alloy, and the like.

A method of sticking the metal film to a glass surface is not particularly limited as long as the metal film is stuck to come into close contact with the glass surface, and examples thereof include vapor deposition, sputtering, plating, application of metal paste or a plating liquid, and the like.

The reducing atmosphere may contain a gas having reducing power. Examples of the gas having reducing power include hydrogen. Accordingly, it is preferable to use a hydrogen-containing gas as the reducing atmosphere, and a forming gas containing hydrogen may be used. The forming gas is a mixed gas of hydrogen and nitrogen, and typically contains approximately 3 to 5 volume % of hydrogen.

The heat treatment is performed at a temperature equal to or higher than a temperature (Tg-200) which is lower than the glass transition temperature Tg by 200° C., and equal to or lower than the softening point temperature. A heat treatment time can be appropriately adjusted in accordance with a target degree of coloration, a range of the colored layer, the thickness of the colored layer, or the like.

After the heat treatment, the metal film is peeled off from the glass surface. A peeling method is not particularly limited, and examples thereof include a removal method through polishing or dissolution, and the like.

The colored layer is formed from the glass surface that is in contact with the metal film to the inside due to the heat treatment in the reducing atmosphere.

A mechanism in which the colored layer is formed by the above-described method is not particularly limited, and is considered as follows.

Coloration of the colored layer formed in the present embodiment is considered as a reducing color caused by a glass component, and particularly as a reducing color caused by a transition metal. Typically, even when a glass molded body is subjected to a heat treatment in an atmosphere containing hydrogen in a low concentration of approximately 3 to 5 volume %, the glass hardly shows a reducing color. However, since the metal film occludes hydrogen ions in the atmosphere, a lot of hydrogen ions are supplied to a portion of the glass which is in contact with the metal film in comparison to a portion that is not in contact with the metal film, and as a result, a reducing reaction proceeds rapidly. Accordingly, the portion of the glass which is in contact with the metal film is deeply colored. Since the amount of hydrogen ions occluded by the metal film is large, the concentration of hydrogen in the atmosphere may decrease due to occlusion by the metal film. For this reason, in the portion that is not in contact with the metal film, the reducing reaction is less likely to proceed.

Here, the reducing reaction of the glass component which is the main cause for coloration proceeds to all directions from the portion that is in contact with the metal film. That is, in observation from a cross-section of the glass, the colored layer is formed from the glass surface that is in contact with the metal film in the thickness direction, and in observation from the glass surface, the colored layer is radially formed from the portion that is in contact with the metal film.

According to the above-described method, a more deeply colored layer can be formed. Accordingly, even when the thickness of the colored layer is small, a transmittance can be sufficiently reduced. In a case where the thickness of the colored layer is small, a range of the colored layer that is observed from the glass surface and is radially formed from the portion that is in contact with the metal film also decreases. That is, according to the present embodiment, when adjusting formation conditions of the colored layer, in the case of observation from the glass surface, a colored layer having approximately the same shape as that of the metal film can be formed.

(Manufacture of Optical Element or the Like)

An optical element formed from the glass according to the present embodiment is obtained by preparing a non-colored optical element and by forming the colored layer to the optical element. The non-colored optical element may be prepared by a known manufacturing method. For example, molten glass is poured into a mold and is molded into a plate shape to produce a glass material. The obtained glass material is appropriately cut, ground, and polished to prepare a cut piece having a size and a shape which are suitable for press forming. The cut piece is heated and softened, and is press formed (reheat-pressed) by a known method to prepare an optical element blank that approximates a shape of the optical element. The optical element blank is annealed and is grounded and polished by a known method to prepare an optical element.

The colored layer can be formed in the prepared optical element by the above-described method. In addition, the colored layer may be formed in the middle of manufacturing the optical element.

An optical functional surface of the prepared optical element may be coated with an antireflection film, a total reflection film, or the like in correspondence with the purpose of use.

According to an aspect of the present invention, an optical element formed from the glass can be provided. Examples of the kind of the optical element include a lens such as a spherical lens and a non-spherical lens, a prism, and the like. Examples of a shape of the lens include various shapes such as a biconvex lens, a plano-convex lens, a biconcave lens, a plano-concave lens, a convex meniscus lens, and a concave meniscus lens. The optical element can be manufactured by a method including processing a glass molded body formed from the above-described glass. Examples of the processing include severance, cutting, rough grinding, fine grinding, polishing, and the like.

As the optical element, an optical element configured to shield light diagonally incident to a light receiving surface of an image sensor such as a CCD and a C-MOS sensor can be exemplified. In the related art, in order to shield light that is diagonally incident to the light receiving surface of the image sensor, a method has been adopted in which a black ink is applied to a portion of a cover glass surface of the image sensor to shield the diagonally incident light and provides light-shielding properties. In this method, there is a problem that at a boundary between a portion applied with the black ink and a portion that is not applied with the black ink, reflection of light occurs on a surface of the black ink, this causes stray light, and thus an image quality of the image sensor deteriorates. In addition, when a temperature rises, degassing occurs in the ink, and this becomes the cause for fogging on the cover glass surface. In contrast, when the glass according to the present embodiment is used, and the colored layer is provided at a site desired to shield diagonally incident light and is set as cover glass, the problem of the stray light or the problem of fogging due to degassing can be solved.

In addition, according to the aspect of the present invention, the glass can be used as a decorative material, an exterior of a small-sized electronic device, or the like by taking advantage of decorativeness of the colored layer.

EXAMPLES

Hereinafter, the present invention will be described in more detail with reference to examples, but the present invention is not limited to the examples.

Glass samples having glass compositions shown in Table 1 were prepared in the following order, and various kinds of evaluation were performed.

TABLE 1

| | No. | No. 1 | No. 2 | No. 3 |
|---|---|---|---|---|
| Cation % | $Si^{4+}$ | 0.0 | 0.0 | 0.0 |
| | $B^{3+}$ | 2.9 | 0.0 | 6.5 |
| | $P^{5+}$ | 28.0 | 27.2 | 26.3 |
| | $Li^+$ | 8.5 | 0.0 | 19.7 |
| | $Al^{3+}$ | 0.0 | 0.0 | 0.0 |
| | $Na^+$ | 8.0 | 1.9 | 16.4 |
| | $K^1$ | 1.9 | 1.4 | 2.3 |
| | $Mg^{2+}$ | 0.0 | 0.0 | 0.0 |
| | $Ca^{2+}$ | 0.0 | 0.0 | 0.0 |
| | $Sr^{2+}$ | 0.0 | 0.0 | 0.0 |
| | $Ba^{2+}$ | 0.8 | 4.0 | 0.5 |
| | $Zn^{2+}$ | 0.0 | 0.0 | 0.9 |
| | Ti ion | 4.0 | 10.4 | 3.0 |
| | Nb ion | 19.5 | 19.4 | 19.0 |
| | W ion | 4.0 | 11.0 | 2.7 |
| | Bi ion | 22.4 | 24.7 | 2.7 |
| | $Ta^{5+}$ | 0.0 | 0.0 | 0.0 |
| | $Zr^{4+}$ | 0.0 | 0.0 | 0.0 |
| | $La^{3+}$ | 0.0 | 0.0 | 0.0 |
| | $Gd^{3+}$ | 0.0 | 0.0 | 0.0 |
| | $Y^{3+}$ | 0.0 | 0.0 | 0.0 |
| | $Yb^{3+}$ | 0.0 | 0.0 | 0.0 |
| | Total | 100 | 100 | 100 |
| | $B^{3+}/P^{5+}$ | 0.104 | 0.000 | 0.247 |
| | $P^{5+} + B^{3+} + Si^{4+} + Al^{3+}$ | 30.9 | 27.2 | 32.8 |
| | Ti + Nb + W + Bi | 49.9 | 65.5 | 27.4 |
| | Ti + Nb + W | 27.5 | 40.8 | 24.7 |
| | (Ti + Nb + W + Bi)/ $(P^{5+} + B^{3+} + Si^{4+})$ | 1.615 | 2.408 | 0.835 |
| | $Li^+ + Na^+$ | 16.5 | 1.9 | 36.1 |
| | $Mg^{2+} + Ca^{2+} + Sr^{2+} + Ba^{2+}$ | 0.8 | 4.0 | 0.5 |
| Mass % (Outer percentage) | $Sb_2O_3$ | 0.1 | 0.02 | 0.01 |
| Characteristics | Refractive index nd | 2.00 | 2.10 | 1.82 |
| | Specific gravity (g/cm³) | 5.1 | 5.6 | 3.7 |
| | Tg (° C.) | 479 | 561 | 454 |
| | Expansion coefficient ($\times 10^{-7}/K$) | 101 | 82 | 121 |
| | Acid durability (Da) | Grade 1 | Grade 1 | Grade 1 |

[Manufacture of Glass]

Oxides, hydroxides, metaphosphates, carbonates, and nitrates corresponding to constituent components of glass were prepared as raw materials, and the raw materials were weighed and combined so that a composition of obtained glass becomes each composition shown in Table 1, and the raw materials were sufficiently mixed. The obtained combined raw material (batch raw material) was fed into a platinum crucible, and was heated at 1100° C. to 1450° C. for two to three hours to obtain molten glass. The molten glass was stirred to be homogenized and clarified, and the molten glass was cast into a mold preheated at an appropriate temperature. The cast glass was subjected to a heat treatment in the vicinity of a glass transition temperature Tg for approximately one hour, and was allowed to be cooled up to room temperature. The glass was processed to a size having a length of 40 mm, a width of 10 mm, and a thickness of 1.0 mm, and two surfaces having dimensions of 40 mm×10 mm were precisely polished (optically polished) to obtain a glass sample.

[Confirmation of Glass Component Composition]

With respect to the obtained glass sample, the contents of respective glass components were measured by inductively coupled plasma atomic emission spectrometry (ICP-AES), and it was confirmed that the composition is as shown in Table 1.

[Measurement of Optical Characteristics]

With respect to the obtained glass sample, the refractive index nd, the specific gravidity, and the glass transition temperature Tg were measured. Results are shown in Table 1.

(i) Refractive Index nd

The refractive index nd was measured by a refractive index measuring method conforming to JIS standard JIS B 7071-1.

(ii) Specific Gravity

The specific gravity was measured by Archimedes method.

(iii) Glass Transition Temperature Tg

The glass transition temperature Tg was measured by using a thermomechanical analyzer (TMA4000S) manufactured by MAC Science Co., Ltd. at a temperature rising rate of 4° C./minute.

[Average Linear Expansion Coefficient]

A method of measuring an average linear expansion coefficient was carried out in conformity to Japanese Optical Glass Industrial Standards JOGIS 08-2003 "Measuring Method for Thermal Expansion of Optical Glass". A diameter of a round rod-shaped sample was set to 5 mm. Results are shown in Table 1.

[Acid Durability Da]

In conformity to definition of Japanese Optical Glass Industrial Standards JOGIS 06-2009, the obtained glass sample was made into powdered glass (particle size: 425 to 600 μm) corresponding to weight of specific gravity, and was put into a platinum basket, was immersed in a quartz-glass round-bottom flask containing 0.01 mol/L nitric acid aqueous solution, was subjected to a treatment in a boiling water bath for 60 minutes, and a weight reduction rate (%) before and after all the above treatment was measured. The weight reduction rate was evaluated as grades. Results are shown in Table 1.

Example 1: Formation of Colored Layer in Samples Different in Glass Composition

Example 1-1

A Pt—Pd film was formed in a pattern shape by sputtering on one of optically polished surfaces of a glass sample having a glass composition of No. 1 among obtained glass samples (current in sputtering: 15 mA, film formation time: 900 sec).

The glass sample on which the Pt—Pd film was formed was subjected to a heat treatment at 400° C. for five hours while supplying a forming gas (hydrogen: 3 volume %, nitrogen: 97 volume %) at a flow rate of 0.2 L/min as a reducing atmosphere.

Figures 1, 5:
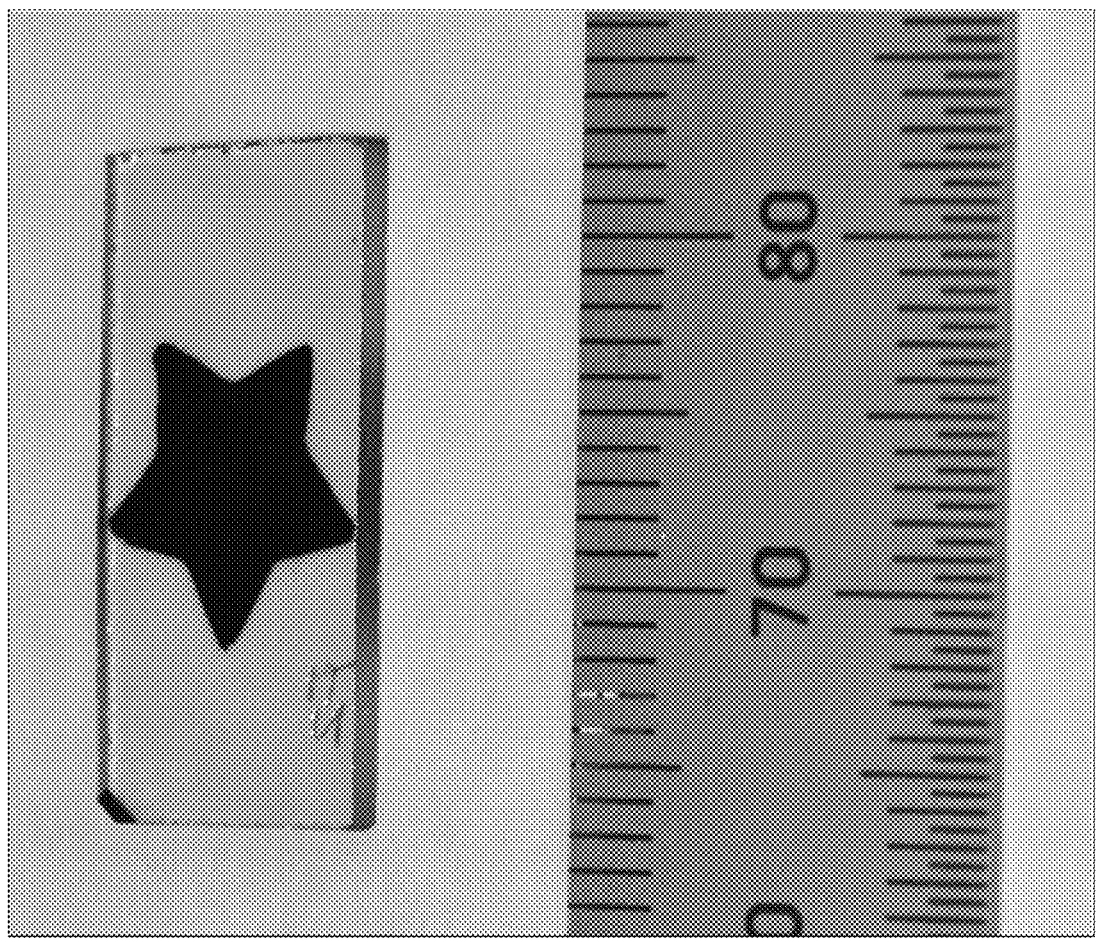
Figures 2, 5:
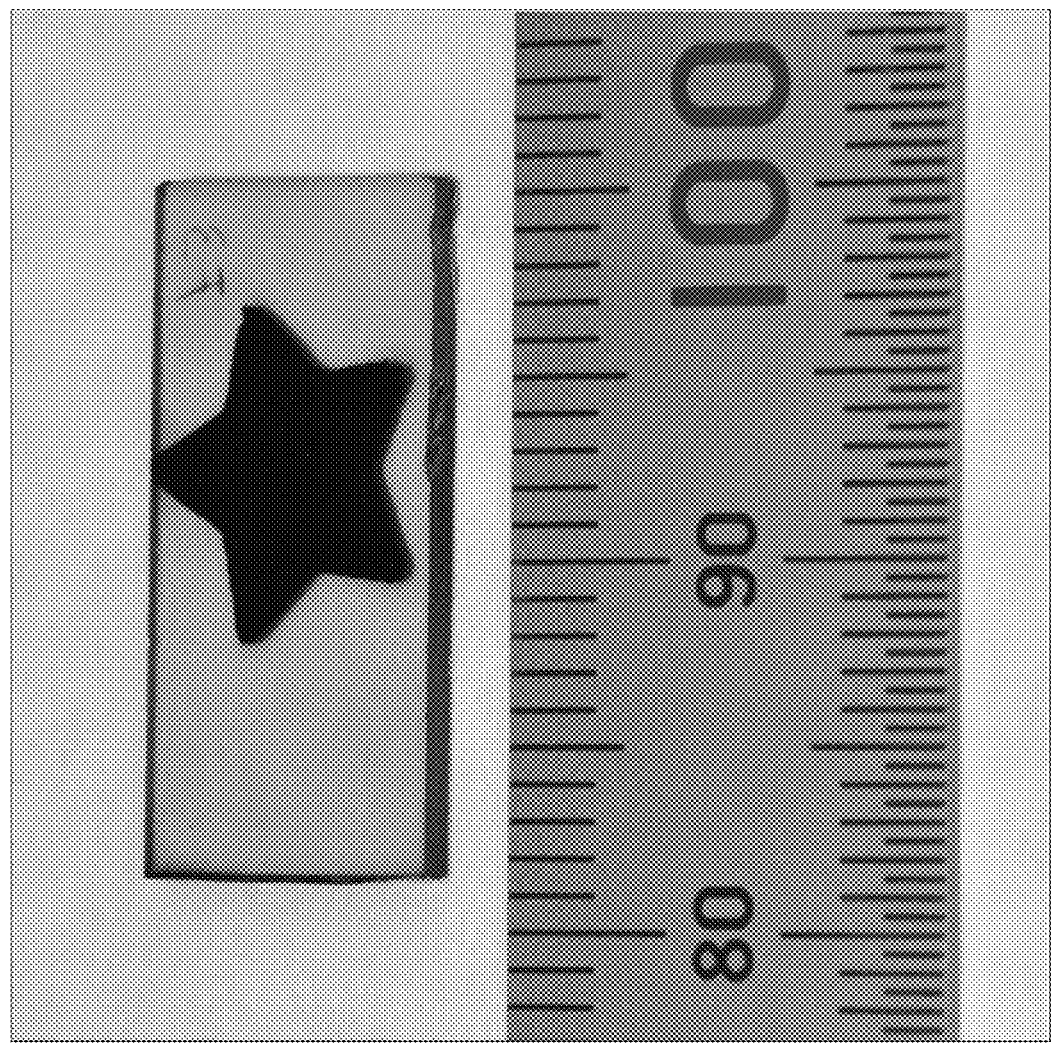

The Pt—Pd film was peeled off by polishing. A glass sample including a colored layer was obtained. The obtained glass sample is shown in FIG. 5-1.

[Measurement of Transmittance]

Figures 1, 6:
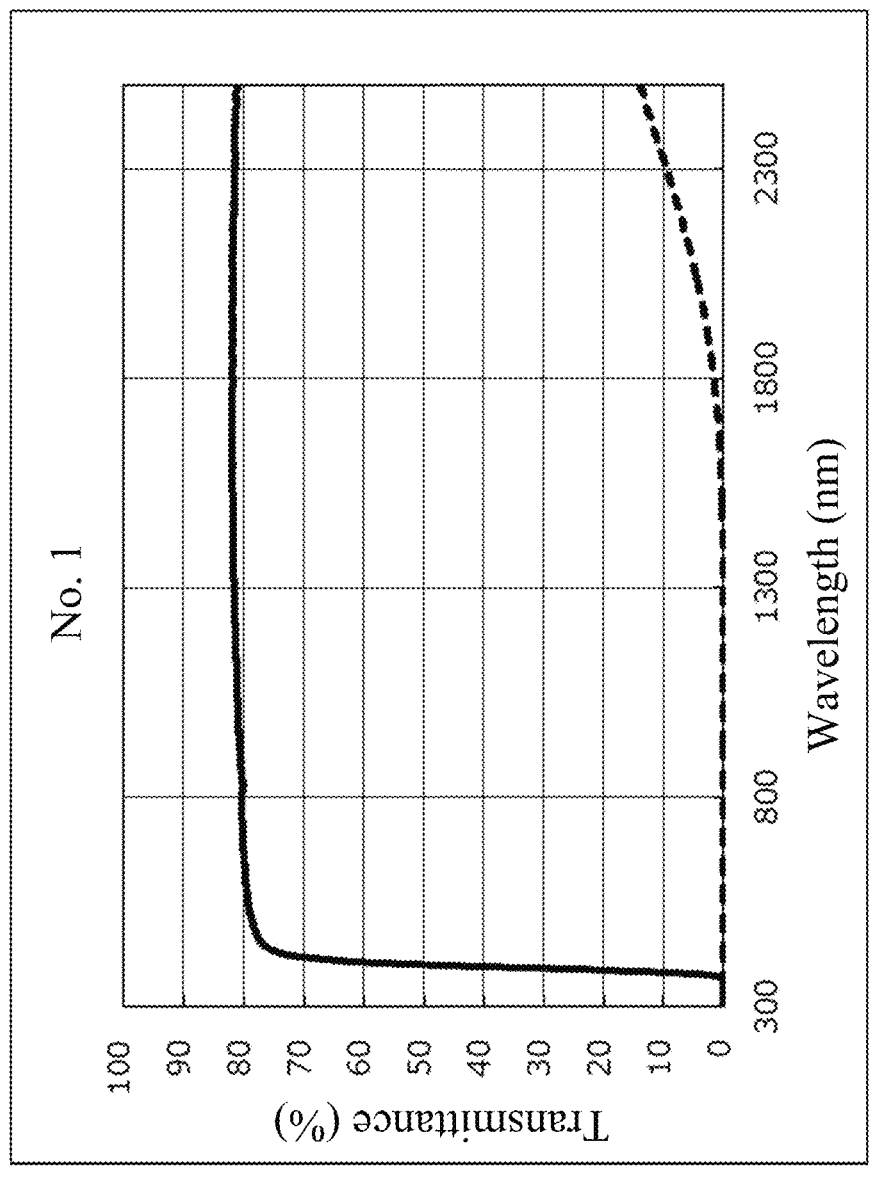
Figures 2, 6:
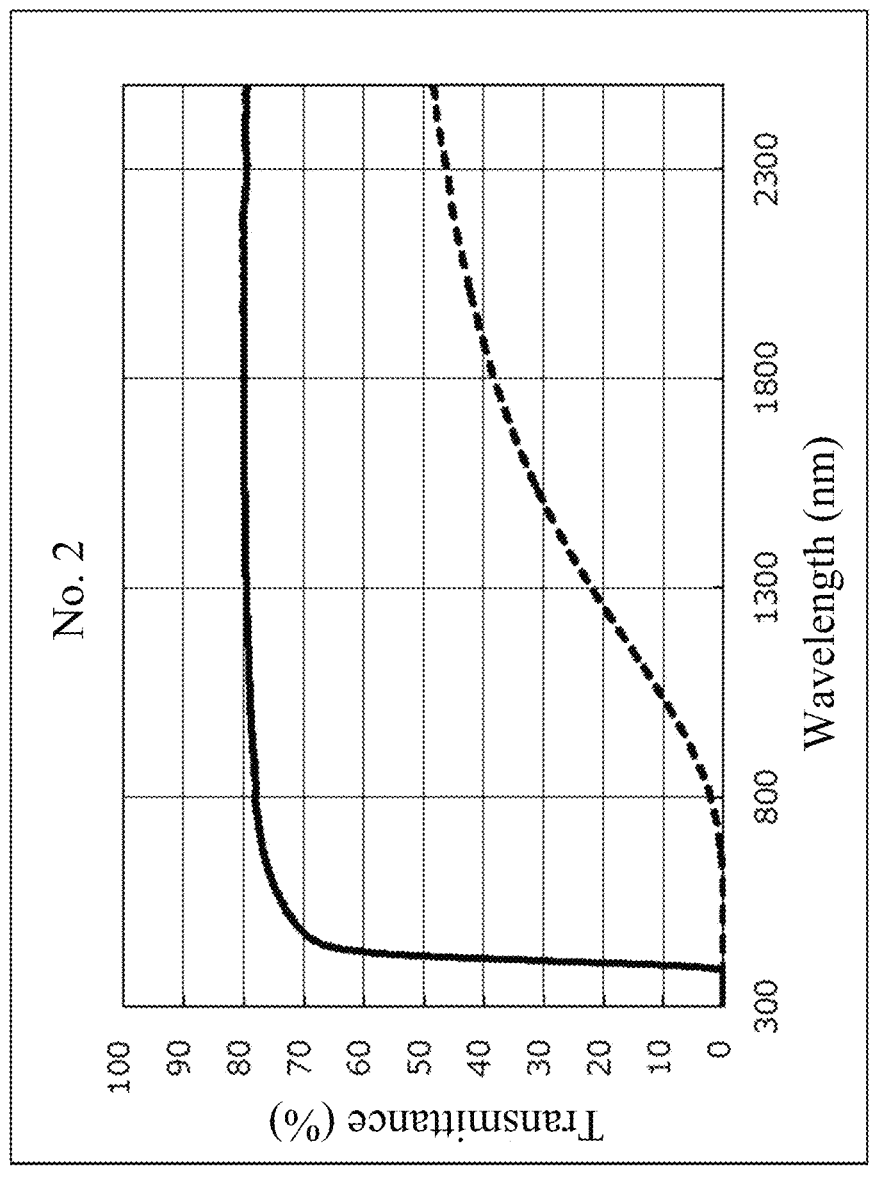
Figures 3, 6:
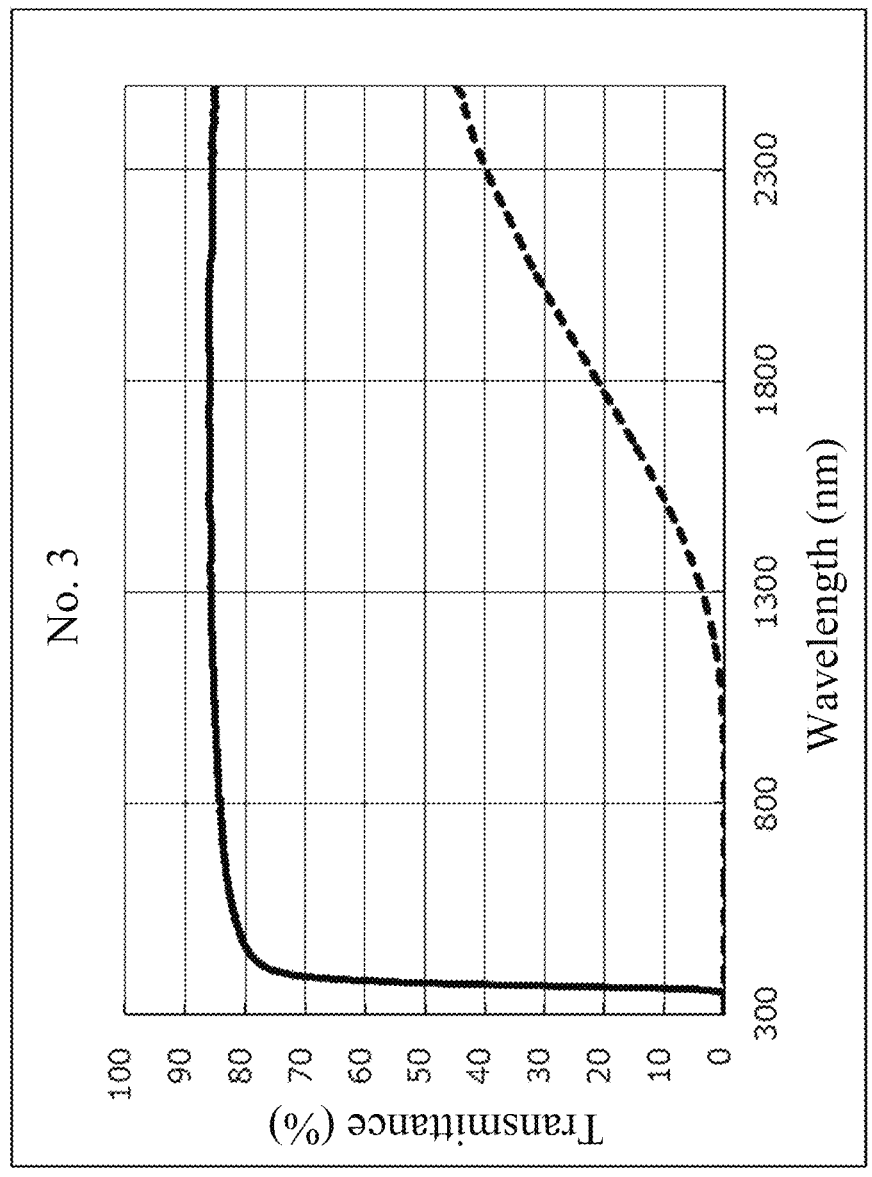

An external transmittance at a wavelength of 300 to 2500 nm was measured. The external transmittance is defined as a percentage [transmitted light intensity/incident light intensity×100] of the transmitted light intensity to the incident light intensity when light is incident in a thickness direction of the glass sample. Note that, a reflection loss of light beams on the sample surface is also included in the external transmittance. A result is shown in FIG. 6-1. In the drawing, a broken line represents a transmittance of a portion including the colored layer, and a solid line represents a transmittance of the same portion before forming the colored layer.

[Measurement of OD]

With respect to the portion including the colored layer, incident light intensity $I_0$ and transmitted light intensity $I$ at a wavelength of 1100 nm were measured, and OD (optical density) was calculated by the following Expression. With respect to the same portion, OD before forming the colored layer was also calculated in a similar manner. A result is shown in Table 2.

$$OD = -\log_{10}(I/I_0)$$

Example 1-2

A glass sample including the colored layer was obtained in a similar manner as in Example 1-1 except that a glass sample having a glass composition of No. 2 was used. The obtained glass sample is shown in FIG. 5-2.

A transmittance was measured in a similar manner as in Example 1-1. A result is shown in FIG. 6-2.

OD was measured in a similar manner as in Example 1-1. A result is shown in Table 2.

Example 1-3

A glass sample including a colored layer was obtained in a similar manner as in Example 1-1 except that a heat treatment was performed at 430° C. for nine hours by using a glass sample having a glass composition of No. 3.

A transmittance was measured in a similar manner as in Example 1-1. A result is shown in FIG. 6-3.

OD was measured in a similar manner as in Example 1-1. A result is shown in Table 2.

TABLE 2

| Glass sample | Before forming colored layer | After forming colored layer |
|---|---|---|
| No. 1 | 0.1 | 4.0 |
| No. 2 | 0.1 | 0.9 |
| No. 3 | 0.1 | 2.1 |

Example 1-4

A glass sample having a glass composition shown in Table 6 was prepared in a similar procedure as described above. In a similar manner as described above, a glass component composition was confirmed and the refractive index nd, the specific gravidity, and the glass transition temperature Tg were measured. In addition, a glass sample including a colored layer was obtained in a similar manner as in Example 1-1 except that a forming gas was supplied with a hydrogen concentration (volume %) and a flow rate shown in Table 6, and a heat treatment was performed at a treatment temperature and for a treatment time as shown in Table 6. OD was measured in a similar manner as in Example 1-1. A result is shown in Table 6.

TABLE 6

| | | Glass sample No. | | | | | | | | |
|---|---|---|---|---|---|---|---|---|---|---|
| | | 4 | 5 | 6 | 7 | 8 | 9 | 10 | 11 | 12 |
| Cation % | $Si^{4+}$ | 0 | 0 | 0 | 0 | 0 | 0 | 0 | 0 | 0 |
| | $B^{3+}$ | 5.1 | 5.1 | 5.1 | 3.3 | 3.3 | 6.5 | 6.5 | 6.5 | 6.5 |
| | $P^{5-}$ | 30.6 | 30.6 | 30.6 | 27.8 | 27.8 | 25.7 | 25.7 | 25.7 | 25.7 |
| | $Al^{3+}$ | 2 | 2 | 3.5 | 0 | 0 | 0 | 0 | 0 | 0 |
| | Li+ | 10.7 | 9.9 | 10.7 | 13.3 | 17.5 | 20.3 | 20.3 | 20.3 | 20.3 |
| | Na+ | 31.7 | 29.5 | 31.7 | 11.3 | 15 | 16 | 16 | 16 | 16 |
| | K+ | 0 | 0 | 0 | 3.2 | 4.3 | 2.3 | 2.3 | 2.3 | 2.3 |
| | $Mg^{2+}$ | 0 | 0 | 0 | 0 | 0 | 0 | 0 | 0 | 0 |
| | $Ca^{2+}$ | 0 | 0 | 0 | 0 | 0 | 0 | 0 | 0 | 0 |
| | $Sr^{2+}$ | 0 | 0 | 0 | 0 | 0 | 0 | 0 | 0 | 0 |
| | $Ba^{2+}$ | 0 | 0 | 0 | 1.1 | 1.1 | 0.5 | 0.5 | 0.5 | 0.5 |
| | $Zn^{2+}$ | 2.6 | 2.6 | 2.6 | 0 | 0 | 0.9 | 0.9 | 0.9 | 0.9 |
| | Ti ion | 1.6 | 0 | 0 | 3.1 | 2.4 | 2.7 | 0 | 0 | 2.7 |
| | Nb ion | 11 | 17.3 | 12.8 | 15.6 | 12.1 | 20.2 | 21.9 | 21.9 | 21.9 |
| | W ion | 1.7 | 0 | 0 | 3.6 | 2.8 | 2.7 | 2.7 | 2.7 | 0 |
| | Bi ion | 3 | 3 | 3 | 17.7 | 13.7 | 2.2 | 3.2 | 3.2 | 3.2 |
| | $Ta^{5+}$ | 0 | 0 | 0 | 0 | 0 | 0 | 0 | 0 | 0 |
| | $Zr^{4+}$ | 0 | 0 | 0 | 0 | 0 | 0 | 0 | 0 | 0 |
| | $La^{3+}$ | 0 | 0 | 0 | 0 | 0 | 0 | 0 | 0 | 0 |
| | $Gd^{3-}$ | 0 | 0 | 0 | 0 | 0 | 0 | 0 | 0 | 0 |
| | $Y^{3+}$ | 0 | 0 | 0 | 0 | 0 | 0 | 0 | 0 | 0 |
| | $Yb^{3+}$ | 0 | 0 | 0 | 0 | 0 | 0 | 0 | 0 | 0 |
| | Total | 100.0 | 100.0 | 100.0 | 100.0 | 100.0 | 100.0 | 100.0 | 100.0 | 100.0 |
| Characteristics | Refractive index nd | 1.70 | 1.73 | 1.68 | 1.93 | 1.86 | | | | |
| | Specific gravity | 3.4 | 3.4 | 3.3 | 4.8 | 4.4 | 3.6 | 3.7 | 3.7 | 3.6 |
| | Tg (° C.) | 435 | 453 | 430 | 454 | 420 | | 452 | 452 | 468 |
| Heat treatment conditions | Concentration of hydrogen [volume %] | 3% | 3% | 3% | 3% | 3% | 3% | 3% | 3% | 3% |
| | Flow rate [L/min] | 0.2 | 0.2 | 0.2 | 0.2 | 0.2 | 0.2 | 0.2 | 0.2 | 0.2 |
| | Treatment temperature [° C.] | 460 | 452 | 429 | 454 | 420 | 430 | 430 | 437 | 430 |
| | Treatment hour [hour] | 15 | 15 | 15 | 15 | 15 | 9 | 9 | 40 | 9 |
| OD (1100 nm) | After forming colored layer | 1.9 | 1.0 | 1.9 | 3.2 | 5.0 | 1.8 | 1.8 | 5.0 | 2.1 |
| | Before forming colored layer | 0.1 | 0.1 | 0.1 | 0.1 | 0.1 | 0.1 | 0.1 | 0.1 | 0.1 |

| | | | Glass sample No. | | | | | |
|---|---|---|---|---|---|---|---|---|
| | | | 13 | 14 | 15 | 16 | 17 | 18 |
| Cation % | | $Si^{4+}$ | 0 | 0 | 0 | 0 | 0 | 0 |
| | | $B^{3+}$ | 6.5 | 6.5 | 6.5 | 6.5 | 6.5 | 6.5 |
| | | $P^{5-}$ | 25.7 | 25.7 | 25.7 | 25.7 | 26.5 | 26.5 |
| | | $Al^{3+}$ | 0 | 0 | 0 | 0 | 0 | 0 |
| | | Li+ | 20.3 | 20.3 | 20.3 | 20.3 | 20.9 | 20.9 |
| | | Na+ | 16 | 16 | 16 | 16 | 16.5 | 16.5 |
| | | K+ | 2.3 | 2.3 | 2.3 | 2.3 | 2.3 | 2.3 |
| | | $Mg^{2+}$ | 0 | 0 | 0 | 0 | 0 | 0 |
| | | $Ca^{2+}$ | 0 | 0 | 0 | 0 | 0 | 0 |
| | | $Sr^{2+}$ | 0 | 0 | 0 | 0 | 0 | 0 |
| | | $Ba^{2+}$ | 0.5 | 0.5 | 0.5 | 0.5 | 0.5 | 0.5 |
| | | $Zn^{2+}$ | 0.9 | 0.9 | 0.9 | 0.9 | 0.9 | 0.9 |
| | | Ti ion | 2.7 | 0 | 0 | 0 | 0 | 8.5 |
| | | Nb ion | 21.9 | 24.6 | 24.6 | 24.6 | 22.6 | 5.6 |
| | | W ion | 0 | 0 | 0 | 0 | 0 | 8.5 |
| | | Bi ion | 3.2 | 3.2 | 3.2 | 3.2 | 3.3 | 3.3 |
| | | $Ta^{5+}$ | 0 | 0 | 0 | 0 | 0 | 0 |
| | | $Zr^{4+}$ | 0 | 0 | 0 | 0 | 0 | 0 |

TABLE 6-continued

|  |  |  |  |  |  |  |  |
|---|---|---|---|---|---|---|---|
|  | $La^{3+}$ | 0 | 0 | 0 | 0 | 0 | 0 |
|  | $Gd^{3+}$ | 0 | 0 | 0 | 0 | 0 | 0 |
|  | $Y^{3+}$ | 0 | 0 | 0 | 0 | 0 | 0 |
|  | $Yb^{3+}$ | 0 | 0 | 0 | 0 | 0 | 0 |
|  | Total | 100.0 | 100.0 | 100.0 | 100.0 | 100.0 | 100.0 |
| Character-istics | Refractive index nd |  | 1.82 | 1.82 | 1.82 | 1.80 | 1.80 |
|  | Specific gravity | 3.6 | 3.6 | 3.6 | 3.6 | 3.6 | 3.8 |
|  | Tg (° C.) | 468 | 456 | 456 | 456 | 454 | 447 |
| Heat treatment conditions | Concentration of hydrogen [volume %] | 3% | 3% | 3% | 3% | 3% | 3% |
|  | Flow rate [L/min] | 0.2 | 0.2 | 0.2 | 0.2 | 0.2 | 0.2 |
|  | Treatment temperature [° C.] | 453 | 430 | 456 | 430 | 454 | 447 |
|  | Treatment hour [hour] | 40 | 9 | 15 | 5 | 15 | 15 |
| OD (1100 nm) | After forming colored layer | 5.0 | 1.7 | 5.0 | 1.3 | 5.0 | 5.0 |
|  | Before forming colored layer | 0.1 | 0.1 | 0.1 | 0.1 | 0.1 | 0.1 |

Example 2: Formation of Colored Luer by Metal Film Different in Film Thickness

Example 2-1

A Pt—Pd film having a film thickness of 28 nm, 256 nm, 288 nm, or 420 nm was formed on one of optically polished surfaces of each glass sample having the glass composition of No. 3 by adjusting film formation conditions.

The glass samples on which the Pt—Pd film was formed were subjected to a heat treatment at 400° C. for four hours while supplying a forming gas (hydrogen: 3 volume %, nitrogen: 97 volume %) at a flow rate of 0.2 L/min as a reducing atmosphere.

The Pt—Pd film was removed by polishing, and glass samples including a colored layer were obtained.

Figures 1, 7:
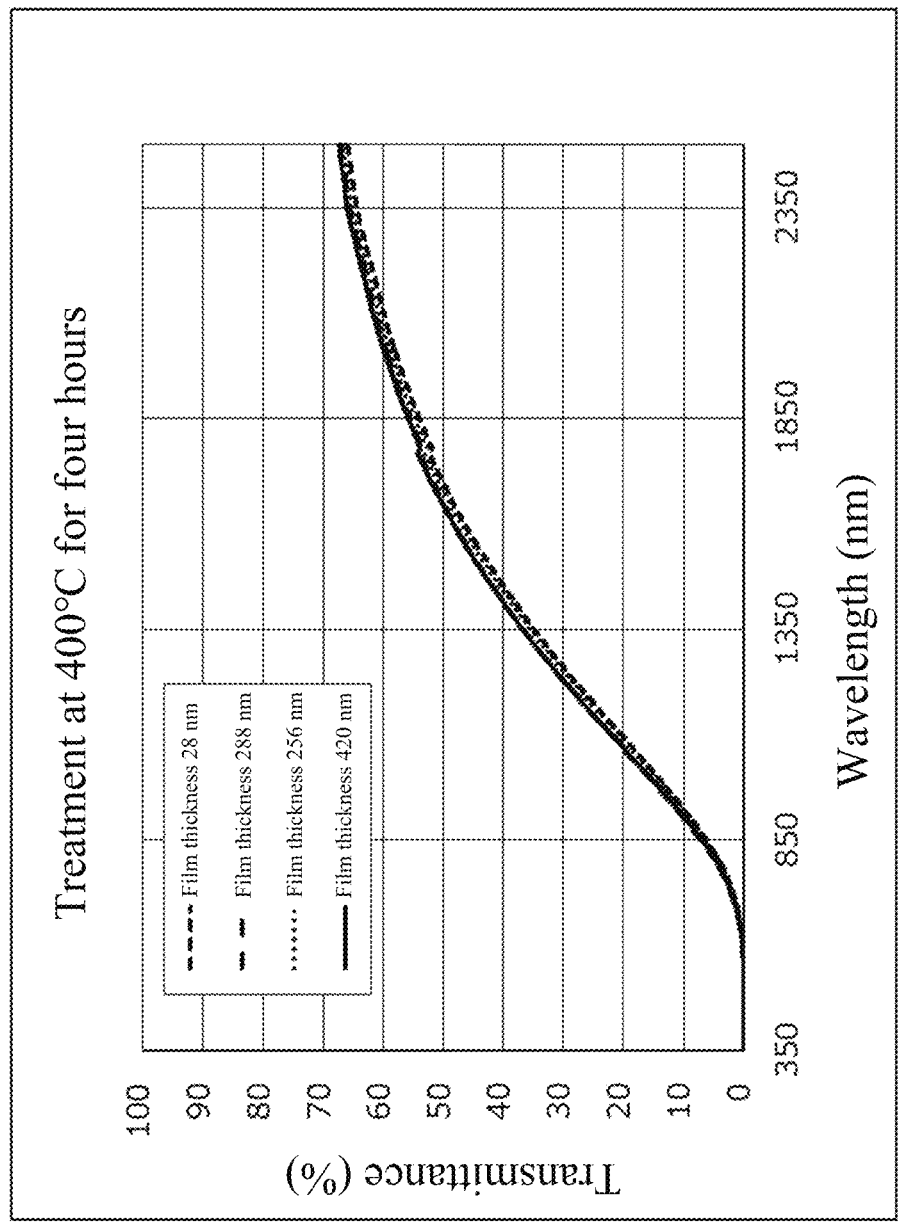
Figures 2, 7:
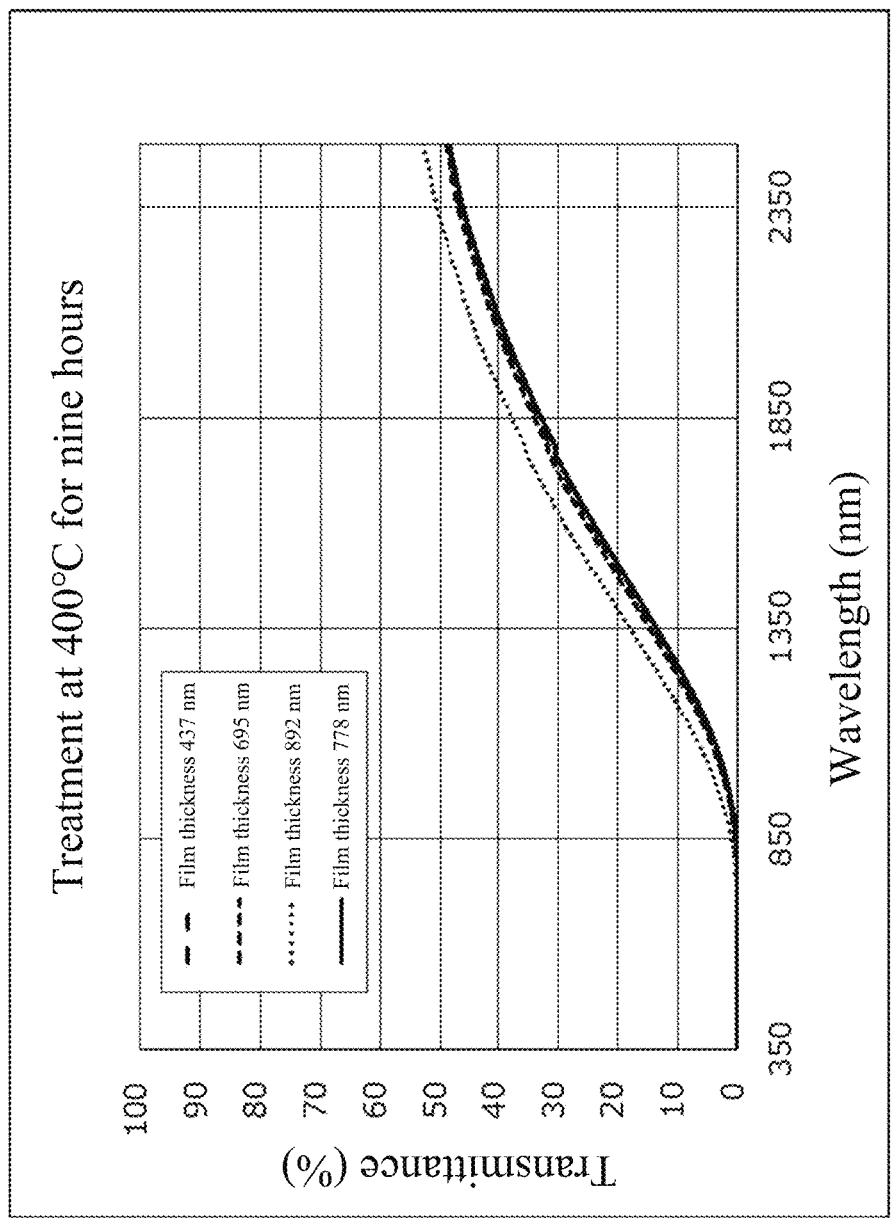

With respect to a portion including a colored layer, a transmittance was measured in a similar manner as in Example 1-1. A relationship between the film thickness of the Pt—Pd film and the transmittance is shown in FIG. 7-1.

Figure 8:
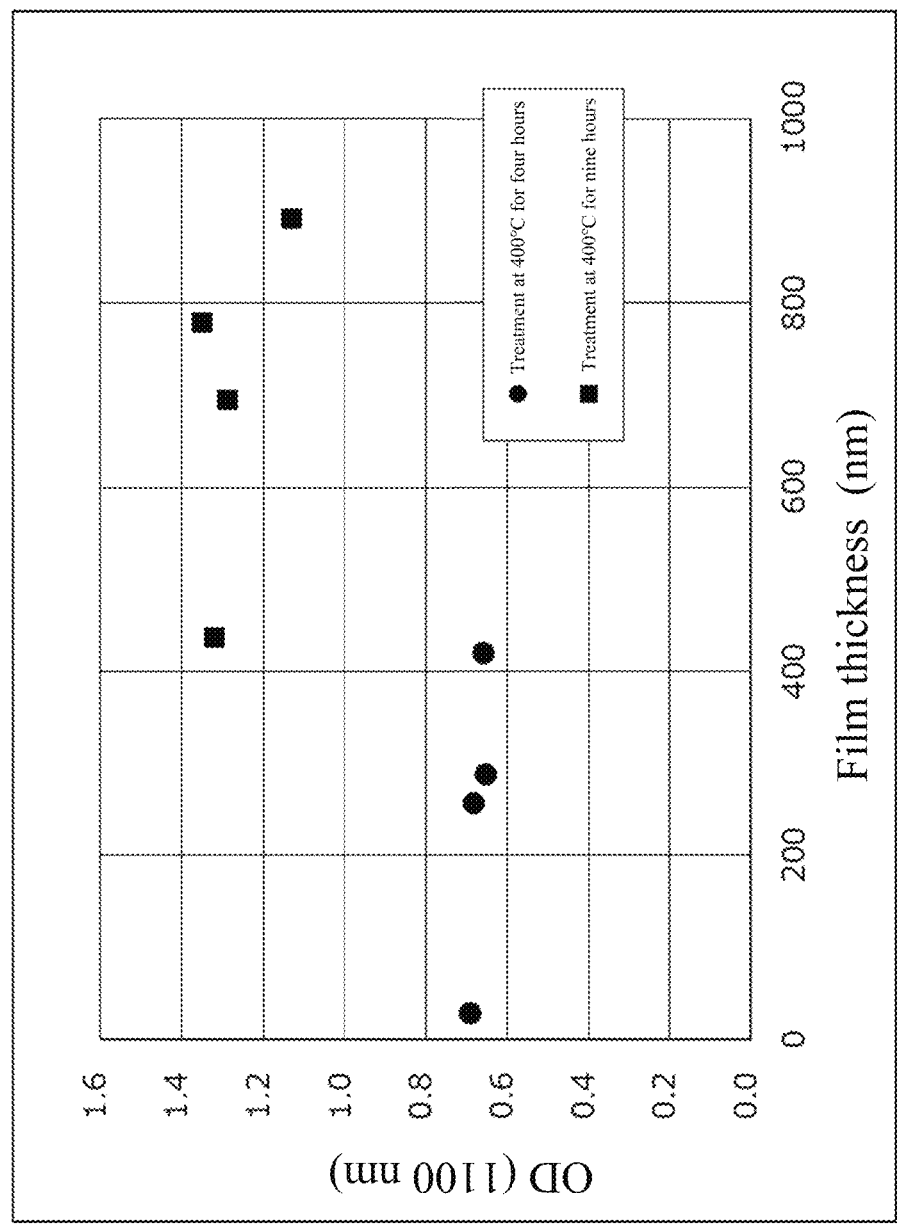
FIG. 8 is a graph showing a relationship between the film thickness of a metal film and OD in the samples according to Examples 2-1 and 2-2 in accordance with heat treatment time.

With respect to the portion including the colored layer, OD was measured in a similar manner as in Example 1-1. A relationship between the film thickness of the Pt—Pd film and OD is shown in FIG. 8.

Example 2-2

A Pt—Pd film having a film thickness of 437 nm, 695 nm, 778 nm, or 892 nm was formed on one of optically polished surfaces of each glass sample having the glass composition of No. 3 by adjusting film formation conditions.

The glass samples on which the Pt—Pd film was formed were subjected to a heat treatment at 400° C. for nine hours while supplying a forming gas (hydrogen: 3 volume %, nitrogen: 97 volume %) at a flow rate of 0.2 L/min as a reducing atmosphere.

The Pt—Pd film was removed by polishing, and glass samples including a colored layer were obtained.

A transmittance was measured in a similar manner as in Example 2-1. A relationship between the film thickness of the Pt—Pd film and the transmittance is shown in FIG. 7-2.

OD was measured in a similar manner as in Example 2-1. A relationship between the film thickness of the Pt—Pd film and OD is shown in FIG. 8.

From FIG. 7-1, FIG. 7-2, and FIG. 8, it could be seen that the transmittance and OD of a portion including the colored layer depends on the heat treatment time instead of the film thickness of the metal film.

Example 3: Formation of Colored Layer by Metal Film Different in Kind

Example 3-1

Glass samples including a colored layer were obtained in a similar manner as in Example 1-1 except that an Au film having a film thickness of 15 nm or 300 nm instead of the Pt—Pd film was formed on an optically polished surface of glass samples having the glass composition of No. 3, and a heat treatment was performed at 450° C. for seven hours.

With respect to a portion including the colored layer, OD was measured in a similar manner as in Example 1-1.

Example 3-2

A glass sample including a colored layer was obtained in a similar manner as in Example 1-1 except that Ag paste was applied onto an optically polished surface of the glass sample having the glass composition of No. 3 instead of formation of the Pt—Pd film, and a heat treatment was performed at 430° C. for 10 hours.

OD was measured in a similar manner as in Example 3-1. A result is shown in Table 3.

TABLE 3

|  | Au film |  | Ag paste |
|---|---|---|---|
| Film thickness (nm) | 15 | 300 | — |
| OD | 0.69 | 4.22 | 0.642 |

Example 3-3

A glass sample including a colored layer was obtained in a similar manner as in Example 1-1 except that an Ni film having a film thickness of approximately 15 nm instead of the Pt—Pd film was formed on an optically polished surface of the glass sample having the glass composition of No. 3 by using vacuum deposition device, and a heat treatment was performed at 430° C. for seven hours. OD was measured in a similar manner as in Example 3-1. A result is shown in Table 9.

Example 3-4

A glass sample including a colored layer was obtained in a similar manner as in Example 1-1 except that a commercially available Pd plating solution was applied onto an optically polished surface of the glass sample having a glass composition of No. 14 and a thickness of 0.4 mm instead of the Pt—Pd film, and was dried at room temperature to form a Pd plated film, and a heat treatment was performed at 410° C. for 15 hours. OD was measured in a similar manner as in Example 3-1. A result is shown in Table 9.

TABLE 9

| Examples | | 3-3 | 3-4 |
|---|---|---|---|
| Metal film | | Ni | Pd |
| OD (1100 nm) | After forming colored layer | 1.37 | 2.80 |
| | Before forming colored layer | 0.07 | 0.06 |

Example 4: Observation of Cross-Section of Glass in which Colored Layer is Formed

Example 4-1

A Pt—Pd film was formed on one of optically polished surfaces of a glass sample having the glass composition of No. 3. In addition, a part of the optically polished surface of the same sample was polished by using an abrasive of No. 1000 (#1000), and a Pt—Pd film was also formed on the portion.

A heat treatment was performed at 400° C. for five hours while supplying a forming gas (hydrogen: 3 volume %, nitrogen: 97 volume %) at a flow rate of 0.2 L/min.

The Pt—Pd film was removed by polishing, and a glass sample including a colored layer was obtained.

The thickness of the colored layer was measured. A result is shown in FIG. 13. In addition, a photomicrograph of a cross-section of a portion including the colored layer is shown in FIG. 13. In the photomicrograph in FIG. 13, the right side is glass, and a central dark portion is the colored layer.

Example 4-2

An Au film was formed on one of optically polished surfaces of a glass sample having the glass composition of No. 3.

A glass sample including the colored layer was obtained in a similar manner as in Example 4-1 except that a heat treatment was performed at 450° C. for seven hours.

The thickness of the colored layer and a photomicrograph of a cross-section of a portion including the colored layer are shown in FIG. 13.

With respect to the portion including the colored layer, OD was measured in a similar manner as in Example 1-1. A result is shown in FIG. 13.

Example 4-3

An Au film was formed on one of optically polished surfaces of a glass sample having the glass composition of No. 3. A glass sample including a colored layer was obtained in a similar manner as in Example 4-2 except that a film formation time of the Au film was set to be longer in comparison to Example 4-2.

The thickness of the colored layer and a photomicrograph of a cross-section of a portion including the colored layer are shown in FIG. 13.

OD was measured in a similar manner as in Example 4-2. A result is shown in FIG. 13.

Example 4-4

A glass sample including a colored layer was obtained in a similar manner as in Example 4-2 except that a Pt—Pd film was formed on both the optically polished surfaces of a glass sample having the glass composition of No. 3.

The thickness of the colored layer and a photomicrograph of a cross-section of a portion including the colored layer are shown in FIG. 13.

OD was measured in a similar manner as in Example 4-2. A result is shown in FIG. 13.

Surface roughness of a surface polished by using an abrasive of No. 1000 (#1000) is larger in comparison to an optically polished surface. From FIG. 13, it could be seen that the thickness of the colored layer that is formed varies in accordance with the surface roughness of glass.

Example 5: Formation of Colored Layer Having Dot Pattern

A Pt—Pd film was formed in a dot pattern shape on an optically polished surface of a glass sample having the glass composition of No. 3. Details are as follows.

A metal plate that has high flatness to a certain extent capable of covering a glass surface and includes a dot pattern-shaped opening was prepared. The metal plate was brought into close contact with the optically polished surface of the glass sample, and the Pt—Pd film was formed in conformity to the dot pattern-shaped opening.

The metal plate was peeled off, and the glass sample including the Pt—Pd film formed in the dot pattern shape was subjected to a heat treatment in a similar manner as in Example 1-3 to obtain a glass sample including a colored layer.

Figure 9:
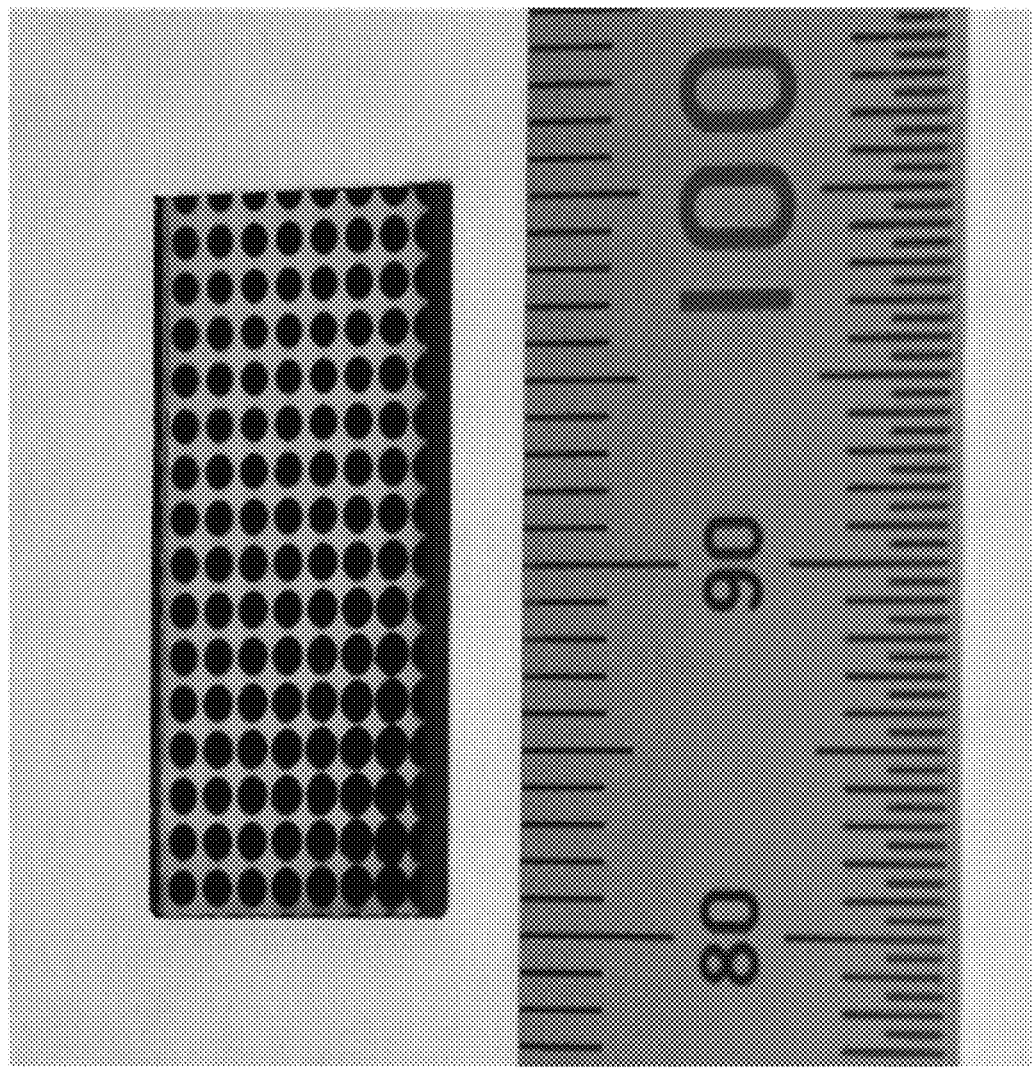
FIG. 9 is an image showing the sample according to Example 5 and a scale for reference.

The obtained glass sample is shown in FIG. 9.

Example 6: Variation of Transmittance Due to Removal of Colored Layer

A glass sample including a colored layer was obtained in a similar manner as in Example 1-3 except that a glass sample having the glass composition of No. 3 was processed to have a thickness of 750 μm.

A cross-section of a portion including the colored layer was observed with a microscope, and it was confirmed that the thickness of the colored layer was 110 μm. In addition, with respect to the portion including the colored layer, OD was measured in a similar manner as in Example 1-1. A result is shown in Table 5.

With respect to the obtained glass sample, the colored layer was polished from a surface provided with the colored layer so that the thickness of the glass sample becomes 660 μm, and OD was measured with respect to the same portion. A result is shown in Table 5.

Similarly, polishing was performed so that the thickness of the glass sample becomes 610 μm, 500 μm, or 380 μm, and OD was measured with respect to the same portion. In addition, the amount of variation from OD before polishing (without polishing margin, that is, without removal by polishing) was calculated. An OD result is shown in Table 5. Note that, in Table 5, "polishing margin" represents the amount of removal by polishing, and is noted as a thickness.

TABLE 5

| Thickness (μm) | 750 | 660 | 610 | 500 | 380 |
|---|---|---|---|---|---|
| Polishing margin (μm) | 0 | 90 | 140 | 250 | 370 |
| OD (1100 nm) | 1.52 | 0.86 | 0.06 | 0.08 | 0.02 |
| Amount of variation of OD (1100 nm) | — | −0.66 | −1.45 | −1.44 | −1.49 |

According to Table 5, when the polishing margin (the amount of removal by polishing) of the glass sample exceeds 140 μm, the amount of variation of OD decreases. When the colored layer is removed by polishing, the glass sample includes only a non-colored portion (a transparent region without coloration). Accordingly, even when the thickness was further reduced by polishing, OD hardly varied. That is, from the result of the amount of variation of OD due to polishing, the thickness of the colored layer of the glass sample is estimated to be more than 90 μm and less than 140 μm. This matches the thickness (100 μm) of the colored layer based on microscope observation on a cross-section. Note that, an increase and a decrease in OD in a range where the polishing margin (the amount of removal by polishing) is 140 to 370 μm is slight, and thus this is considered as a measurement error.

Example 7: Variation (2) of Transmittance Due to Removal of Colored Layer

A glass sample including a colored layer was obtained in a similar manner as in Example 1-1 except that a glass sample having the glass composition of No. 3 was processed to have a thickness of 1 mm.

Figure 10:
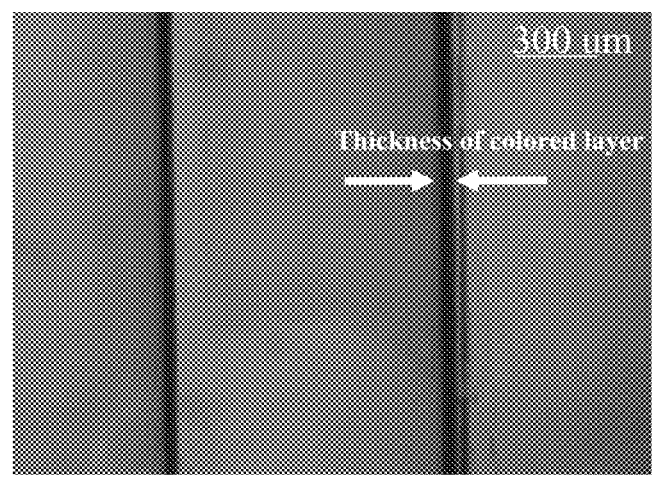
FIG. 10 is a photomicrograph of a cross-section of the portion including a colored layer in the sample according to Example 7.
Figure 11:
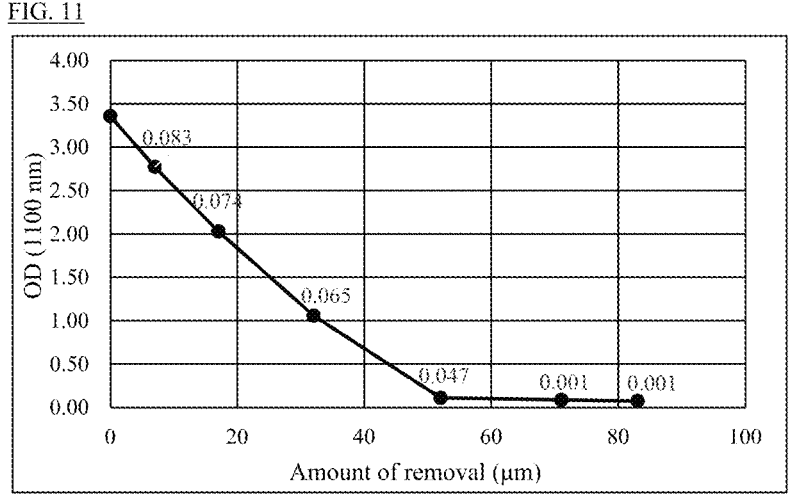
FIG. 11 is a graph showing OD (wavelength: 1100 nm) when the horizontal axis represents the amount of removal in a thickness direction with respect to the sample according to Example 7, and a numerical value in the graph is ΔOD.
Figure 12:
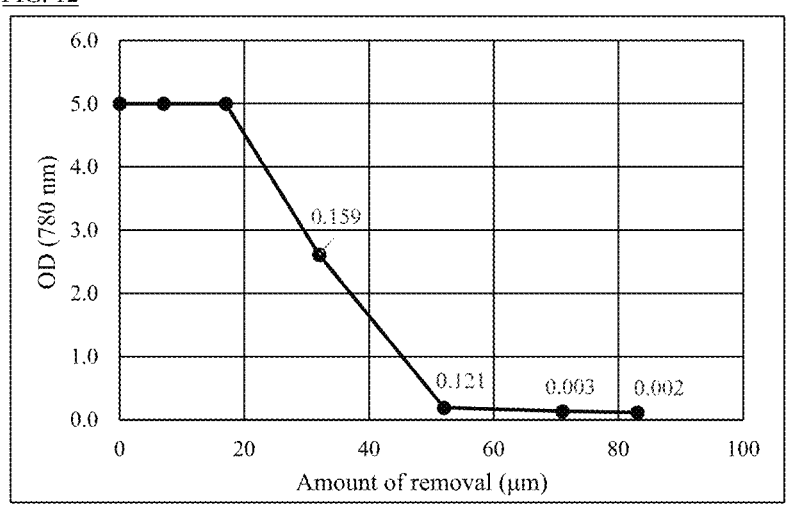
FIG. 12 is a graph showing OD (wavelength: 780 nm) when the horizontal axis represents the amount of removal in a thickness direction with respect to the sample according to Example 7, and a numerical value in the graph is ΔOD.

A cross-section of a portion including the colored layer was observed with a microscope, and it was confirmed that the thickness of the colored layer was approximately 55 μm. A photomicrograph of a cross-section of a portion including the colored layer is shown in FIG. 10. In addition, with respect to the portion including the colored layer, OD at a wavelength of 1100 nm and a wavelength of 780 nm was measured in a similar manner as in Example 1-1. Furthermore, OD when removing the portion including the colored layer by 7 μm, 17 μm, 32 μm, 52 μm, 71 μm, or 83 μm in a thickness direction was measured. An actual measurement value of OD at this time, the amount of variation (OD1−OD2) of OD obtained through comparison with OD before removing the colored layer, and ΔOD are shown in Tables 7 and 8. In addition, the actual measurement value of OD when the horizontal axis is set as the amount of removal in the thickness direction is shown in graphs of FIGS. 11 and 12. Note that, ΔOD was calculated by the following expression.

$$\Delta OD=(OD1-OD2)/(\text{amount of removal [μm]})$$

TABLE 7

| Amount of removal [μm] | OD1 (1100 nm) | OD2 (1100 nm) | OD1 − OD2 (1100 nm) | ΔOD (1100 nm) |
|---|---|---|---|---|
| 0 | 3.36 | — | 0.00 | — |
| 7 | — | 2.77 | 0.58 | 0.083 |
| 17 | — | 2.03 | 1.33 | 0.074 |
| 32 | — | 1.06 | 2.30 | 0.065 |
| 52 | — | 0.11 | 3.25 | 0.047 |
| 71 | — | 0.09 | 3.27 | 0.001 |
| 83 | — | 0.07 | 3.28 | 0.001 |

TABLE 8

| Amount of removal [μm] | OD1 (780 nm) | OD2 (780 nm) | OD1 − OD2 (780 nm) | ΔOD (780 nm) |
|---|---|---|---|---|
| 0 | 5.00 | — | 0.00 | — |
| 7 | — | 5.00 | 0.00 | 0.000 |
| 17 | — | 5.00 | 0.00 | 0.000 |
| 32 | — | 2.61 | 2.39 | 0.159 |
| 52 | — | 0.19 | 4.81 | 0.121 |
| 71 | — | 0.14 | 4.87 | 0.003 |
| 83 | — | 0.12 | 4.88 | 0.002 |

EXPLANATIONS OF LETTERS OR NUMERALS

1 GLASS MAIN BODY
2 COLORED LAYER

The invention claimed is:
1. Glass comprising a colored layer, wherein
the glass includes a small-transmittance portion and a large-transmittance portion,
the colored layer has thickness of 1 to 300 μm, and
the glass has a region where ΔOD is 0.04 or more,
   wherein ΔOD is defined by the following equation, wherein
   OD1 is an optical density at wavelength of 1100 nm or 780 nm when thickness is T1, and
   OD2 is an optical density at the same wavelength when thickness is reduced to T2 by removing the colored layer in a thickness direction by polishing:

$$\Delta OD=(OD1-OD2)/(T1-T2).$$

2. The glass according to claim 1,
wherein a transmittance of the colored layer is smaller than that of a portion where the colored layer is not formed.
3. The glass according to claim 2,
wherein a refractive index of the colored layer is equivalent to that of the portion where the colored layer is not formed.
4. The glass according to claim 2,
wherein a composition of the colored layer is the same as that of the portion where the colored layer is not formed.
5. The glass according to claim 1,
wherein the glass contains at least one glass component selected from the group consisting of Ti ion, Nb ion, Bi ion, and W ion.
6. The glass according to claim 1, wherein the glass contains Bi ion as a glass component.
7. The glass according to claim 6,
wherein a content of Bi ion of the glass is 40 cation % or less.

8. The glass according to claim 6,
wherein a content of Bi ion of the glass is 0.5 cation % or more.

9. The glass according to claim 1,
wherein the glass is phosphate glass.

10. The glass according to claim 9,
wherein a content of $P^{5+}$ of the glass is 50 cation % or less.

11. The glass according to claim 9,
wherein a content of $P^{5+}$ of the glass is 10 cation % or more.

12. The glass according to claim 1,
wherein the glass has a refractive index of 1.70 or more.

13. An optical element formed from the glass according to claim 1.

14. A method of manufacturing the glass according to claim 1, comprising;
preparing a non-colored glass,
sticking a metal film on a surface of the non-colored glass,
performing a heat treatment in a reducing atmosphere, and
removing the metal film.

15. The method according to claim 14,
wherein the heat treatment is performed at a temperature equal to or higher than a temperature which is lower than a glass transition temperature Tg by 200° C., and equal to or lower than a softening point temperature.

16. The method according to claim 14,
wherein the metal film contains at least one metal selected from the group consisting of Ni, Au, Ag, Pt, Pd, and a Pt—Pd alloy.

17. The method according to claim 14,
wherein the reducing atmosphere contains a gas including hydrogen.

18. The method according to claim 14,
wherein the non-colored glass contains a transition metal as a glass component.

19. An optical element comprising a colored layer that exists in a layer shape from a surface toward an inside of the optical element, wherein
the optical element includes a small-transmittance portion and a large-transmittance portion,
the colored layer has thickness of 1 to 300 μm, and
the optical element has a region where ΔOD is 0.04 or more,
wherein ΔOD is defined by the following equation, wherein
OD1 is an optical density at wavelength of 1100 nm or 780 nm when thickness is T1, and
OD2 is an optical density at the same wavelength when thickness is reduced to T2 by removing the colored layer in a thickness direction by polishing:

$\Delta OD = (OD1 - OD2)/(T1 - T2)$.

* * * * *